US012670410B2

(12) United States Patent
Kadhe et al.

(10) Patent No.: US 12,670,410 B2
(45) Date of Patent: Jun. 30, 2026

(54) PRIVACY ENHANCED FEDERATED TRAINING AND INFERENCE OVER VERTICALLY AND HORIZONTALLY PARTITIONED DATA

(71) Applicant: International Business Machines Corporation, Armonk, NY (US)

(72) Inventors: Swanand Ravindra Kadhe, San Jose, CA (US); Heiko H. Ludwig, San Francisco, CA (US); Nathalie Baracaldo Angel, San Jose, CA (US); Yi Zhou, San Jose, CA (US); Alan Jonathan King, South Salem, NY (US); Keith Coleman Houck, Rye, NY (US); Ambrish Rawat, Dublin (IE); Mark Purcell, Naas (IE); Naoise Holohan, Maynooth (IE); Mikio Takeuchi, Yokohama (JP); Ryo Kawahara, Toshima-ward (JP); Nir Drucker, Zichron Yaakov (IL); Hayim Shaul, Kfar Saba (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 693 days.

(21) Appl. No.: 18/166,027

(22) Filed: Feb. 8, 2023

(65) Prior Publication Data

US 2024/0249153 A1      Jul. 25, 2024

Related U.S. Application Data

(60) Provisional application No. 63/481,719, filed on Jan. 26, 2023, provisional application No. 63/481,121, filed on Jan. 23, 2023.

(51) Int. Cl.
G06N 3/098       (2023.01)
G06N 5/04        (2023.01)

(52) U.S. Cl.
CPC ............... *G06N 3/098* (2023.01); *G06N 5/04* (2013.01)

(58) Field of Classification Search
CPC .......... G06N 20/00; G06N 3/098; G06N 5/01; G06N 5/04
See application file for complete search history.

(56) References Cited

U.S. PATENT DOCUMENTS

| | | |
|---|---|---|
| 11,429,903 B2 | 8/2022 | Gu et al. |
| 2019/0026489 A1 | 1/2019 | Nerurkar et al. |

(Continued)

FOREIGN PATENT DOCUMENTS

| | | |
|---|---|---|
| CN | 111368901 A | 7/2020 |
| CN | 111598186 B | 7/2021 |

(Continued)

OTHER PUBLICATIONS

Erlingsson, et al., "Amplification by Shuffling: From Local to Central Differential Privacy via Anonymity," arXiv:1811.12469v2 [cs.LG] Jul. 26, 2020.

(Continued)

*Primary Examiner* — Olugbenga O Idowu
(74) *Attorney, Agent, or Firm* — Amin, Turocy & Watson, LLP

(57) ABSTRACT

Systems, devices, computer program products and/or computer-implemented methods of use provided herein relate to federated training and inferencing. A system can comprise a memory that stores computer executable components, and a processor that executes the computer executable components stored in the memory, wherein the computer executable components can comprise a modeling component that (Continued)

HORIZONTAL FEDERATED TRAINING 300

VERTICAL FEDERATED TRAINING 302 trains an inferential model using data from a plurality of parties and comprising horizontally partitioned data and vertically partitioned data, wherein the modeling component employs a random decision tree comprising the data to train the inferential model, and an inference component that responds to a query, employing the inferential model, by generating an inference, wherein first party private data, of the data, originating from a first passive party of the plurality of parties, is not directly shared with other passive parties of the plurality of parties to generate the inference.

17 Claims, 12 Drawing Sheets

(56)                    References Cited

U.S. PATENT DOCUMENTS

| | | | | |
|---|---|---|---|---|
| 2021/0143987 | A1 | 5/2021 | Xu et al. | |
| 2021/0174243 | A1 | 6/2021 | Angel et al. | |
| 2022/0114456 | A1 | 4/2022 | Nouri et al. | |
| 2022/0255764 | A1* | 8/2022 | Li | G06F 21/606 |
| 2022/0300618 | A1* | 9/2022 | Ding | G06N 5/01 |
| 2022/0358417 | A1 | 11/2022 | Liu et al. | |
| 2024/0249018 | A1 | 7/2024 | Rawat et al. | |

FOREIGN PATENT DOCUMENTS

| | | | |
|---|---|---|---|
| CN | 113792937 | A | 12/2021 |
| CN | 113807544 | A | 12/2021 |
| WO | 2021/022707 | A1 | 2/2021 |
| WO | 2022/144000 | A1 | 7/2022 |

OTHER PUBLICATIONS

Liu, et al., "Learning discrete distributions: user vs item-level privacy," arXiv:2007.13660v3 [cs.LG] Jan. 11, 2021.

Chen, et al., "The Fundamental Price of Secure Aggregation in Differentially Private Federated Learning," arXiv:2203.03761v1 [cs.LG] Mar. 7, 2022.

Liew, et al., "Network Shuffling: Privacy Amplification via Random Walks," arXiv:2204.03919v1 [cs.CR] Apr. 8, 2022.

Chen, et al., "The Poisson binomial mechanism for secure and private federated learning," arXiv:2207.09916v1 [cs.CR] Jul. 9, 2022.

Steinke, "Composition of Differential Privacy & Privacy Amplication by Subsampling," arXiv:2210.00597v4 [cs.CR] Oct. 26, 2022.

Chaudhuri, et al., "Differentially Private Empirical Risk Minimization Kamalika," Journal of Machine Learning Research 12 (Aug. 31, 2011) 1069-1109.

Jagielski, et al., "Auditing Differentially Private Machine Learning: How Private is Private SGD?," from the 34th Conference on Neural Information Processing Systems (NeurIPS 2020, Sun Dec 6th through Sat the 12th), Vancouver, Canada.

Nissim, et al., "Smooth Sensitivity and Sampling in Private Data Analysis," STOC '07: Proceedings of the thirty-ninth annual ACM symposium on Theory of computing Jun. 2007, pp. 75-84, https://doi.org/10.1145/1250790.1250803.

Qiu, et al., "DeepInf: Social Influence Prediction with Deep Learning," arXiv:1807.05560v1 [cs.SI] Jul. 15, 2018.

Wu, et al., "LinkTeller: Recovering Private Edges from Graph Neural Networks via Influence Analysis," rXiv:2108.06504v2 [cs.LG] Aug. 20, 2021.

Mülle, et al., "Privacy-Integrated Graph Clustering Through Differential Privacy," 2015, Copyright is with the authors. Published in the Workshop Proceedings of the EDBT/ICDT 2015 Joint Conference (Mar. 27, 2015, Brussels, Belgium) on CEUR-WS.org (ISSN 1613-0073).

Sajadmanesh, et al., "GAP: Differentially Private Graph Neural Networks with Aggregation Perturbation," arXiv:2203.00949v3 [cs.LG] Nov. 18, 2022.

Abadi, et al., "Deep Learning with Differential Privacy," rXiv:1607.00133v2 [stat.ML] Oct. 24, 2016.

Yu, et al., "Differentially Private Model Publishing for Deep Learning," arXiv:1904.02200v5 [cs.CR] Dec. 19, 2019.

Gartner.com, "Gartner Identifies Top Five Trends in Privacy Through 2024," May 31, 2022, https://www.gartner.com/en/newsroom/press-releases/2022-05-31-gartner-identifies-top-five-trends-in-privacy-through-2024.

Kairouz, et al., "The Distributed Discrete Gaussian Mechanism for Federated Learning with Secure Aggregation," rXiv:2102.06387v4 [cs.LG] Sep. 8, 2022.

Liu, et al., "Learning discrete distributions: user vs item-level privacy," rXiv:2007.13660v3 [cs.LG] Jan. 11, 2021.

Papernot, et al., "Hyperparameter Tuning with Renyi Differential Privacy," arXiv:2110.03620v2 [cs.LG] Mar. 14, 2022.

Bonawitz, et al., "Practical Secure Aggregation for Privacy-Preserving Machine Learning," CCS '17: Proceedings of the 2017 ACM SIGSAC Conference on Computer and Communications SecurityOct. 2017 pp. 1175-1191https://doi.org/10.1145/3133956.3133982.

Truex, et al., "A Hybrid Approach to Privacy-Preserving Federated Learning," arXiv:1812.03224v2 [cs.LG] Aug. 14, 2019.

Xu, et al., "HybridAlpha: An Efficient Approach for Privacy-Preserving Federated Learning," arXiv:1912.05897v1 [cs.CR] Dec. 12, 2019.

Kadhe, et al., "FastSecAgg: Scalable Secure Aggregation for Privacy-Preserving Federated Learning," arXiv:2009.11248v1 [cs.CR] Sep. 23, 2020.

Bell, et al., "Secure Single-Server Aggregation with (Poly)logarithmic Overhead," CCS '20, Nov. 9-13, 2020, Virtual Event, USA.

Ludwig, et al., "PEP-4 : Privacy Enhanced Pandemic Forecasting; IBM Research," Last Accessed: Dec. 22, 2022.

Ludwig, et al., "PV4AML: Private Vertical FL for Anti-Money Laundering (AML), IBM Research," Last Accessed: Jan. 3, 2023.

Ong, et al., "Adaptive Histogram-Based Gradient Boosted Trees for Federated Learning," rXiv:2012.06670v1 [cs.LG] Dec. 11, 2020.

Hardy, et al., "Private Federated Learning on Vertically Partitioned Data via Entity Resolution and Additively Homomorphic," arXiv:1711.10677v1 [cs.LG] Nov. 29, 2017.

Wu, et al., "Privacy Preserving Vertical Federated Learning for Tree-based Models," arXiv:2008.06170v1 [cs.CR] Aug. 14, 2020.

Fu, et al., "VF2Boost: Very Fast Vertical Federated Gradient Boosting for Cross-Enterprise Learning," SIGMOD '21: Proceedings of the 2021 International Conference on Management of Data, Jun. 2021, pp. 563-57, https://doi.org/10.1145/3448016.3457241.

Wang, et al., "Feverless: Fast and Secure Vertical Federated Learning based on XGBoost for Decentralized Labels," Sep. 28, 2021, ICLR 2022 Submitted.

Xu, et al., "FedV: Privacy-Preserving Federated Learning over Vertically Partitioned Data," rXiv:2103.03918v2 [cs.LG] Jun. 16, 2021.

Das, et al., "Cross-Silo Federated Learning for Multi-Tier Networks with Vertical and Horizontal Data Partitioning," arXiv:2108.08930v3 [cs.LG] Jun. 20, 2022.

Romanini, et al., "PyVertical: A Vertical Federated Learning for Multi-headed SplitNN", ICLR Workshop, May 3rd through Fri the 7th, 2021, https://github.com/OpenMined/PyVertical.

Lu, et al., "Multi-party Private Set Intersection in Vertical Federated Learning," Published in: 2020 IEEE 19th International Conference on Trust, Security and Privacy in Computing and Communications (TrustCom), Date of Conference: Dec. 29, 2020-Jan. 1, 2021, DOI: 10.1109/TrustCom50675.2020.00098.

He, et al., "Secure Logistic Regression for Vertical Federated Learning," Published in: IEEE Internet Computing (vol. 26, Issue: 2, Mar. 1-Apr. 2022), Date of Publication: Dec. 28, 2021, DOI: 10.1109/MIC.2021.3138853.

Cai, et al., "Secure Forward Aggregation for Vertical Federated Neural Networks," arXiv:2207.00165v1 [cs.CR] Jun. 28, 2022.

Angelou, et al., "Asymmetric Private Set Intersection with Applications to Contact Tracing and Private Vertical Federated Machine Learning," rXiv:2011.09350v1 [cs.CR] Nov. 18, 2020.

Gu, et al., "Privacy-Preserving Asynchronous Vertical Federated Learning Algorithms for Multiparty Collaborative Learning," Pub-

(56)    References Cited

OTHER PUBLICATIONS lished in: IEEE Transactions on Neural Networks and Learning Systems ( vol. 33, Issue: 11, Nov. 2022), Date of Publication: Jun. 23, 2021, DOI: 10.1109/TNNLS.2021.3072238.
Liu, et al., "Federated Forest," Published in: IEEE Transactions on Big Data ( vol. 8, Issue: 3, Jun. 1, 2022), Date of Publication: May 7, 2020, DOI: 10.1109/TBDATA.2020.2992755.
Zhang, et al., "BatchCrypt: Efficient Homomorphic Encryption for Cross-Silo Federated Learning," Proceedings of the 2020 USENIX Annual Technical Conference, Jul. 15-17, 2020, https://www.usenix.org/system/files/atc20-zhang-chengliang.pdf.
Chung, "Meet the Winners of the U.S. PETs Prize Challenge: Phase 1," Nov. 10, 2022, https://drivendata.co/blog/federated-learning-pets-prize-winners-phase1.
List of IBM Patents or Applications Treated as Related.

* cited by examiner

MULTI-RECORD ALIGNMENT
400

FIRST PARTY 401

| ID | Ordering Account | ... | Anomalous |
|----|------------------|-----|-----------|
| tx₁ | 92321 | ⋮ | 0 |
| tx₂ | FE23401 | ⋮ | 0 |
| tx₃ | FE23401 | ⋮ | 1 |
| tx₄ | 92321 | ⋮ | 0 |
| tx₅ | FE23401 | ⋮ | 0 |
| txₙ | TE92321 | ⋮ | 1 |

SECOND PARTY 402

| Account ID | Flag |
|------------|------|
| FE232012 | 0 |
| FE23401 | 1 |
| 92321 | 1 |
| TE8202 | 0 |

FIG. 4

ENSEMBLE 600 OF RANDOM
DECISION TREES 602

602

602

A.P. FEATURE 236

PRIMARY LEAF NODE 636

P.P. FEATURE 242

SECONDARY LEAF NODE 642

700

RANDOM DECISION TREE
702

Settlement Amount

< 100k

> 100k

Beneficiary
Account Flag

Sender-Receiver
Frequency

Flag = '0'   Flag ≠ '0'

Currency

Hour

Hour

€

$

€

$

Outside
8am to 5pm

Between 8am
to 5pm $f_h[L_j]$ = Beneficiary Acc. Flag
tests$_{j_h}[L_j]$ = flag equal to '0'

A.P. FEATURE 236          P.P. FEATURE 242

PRIMARY LEAF NODE 636          SECONDARY LEAF NODE 642

FIG. 9

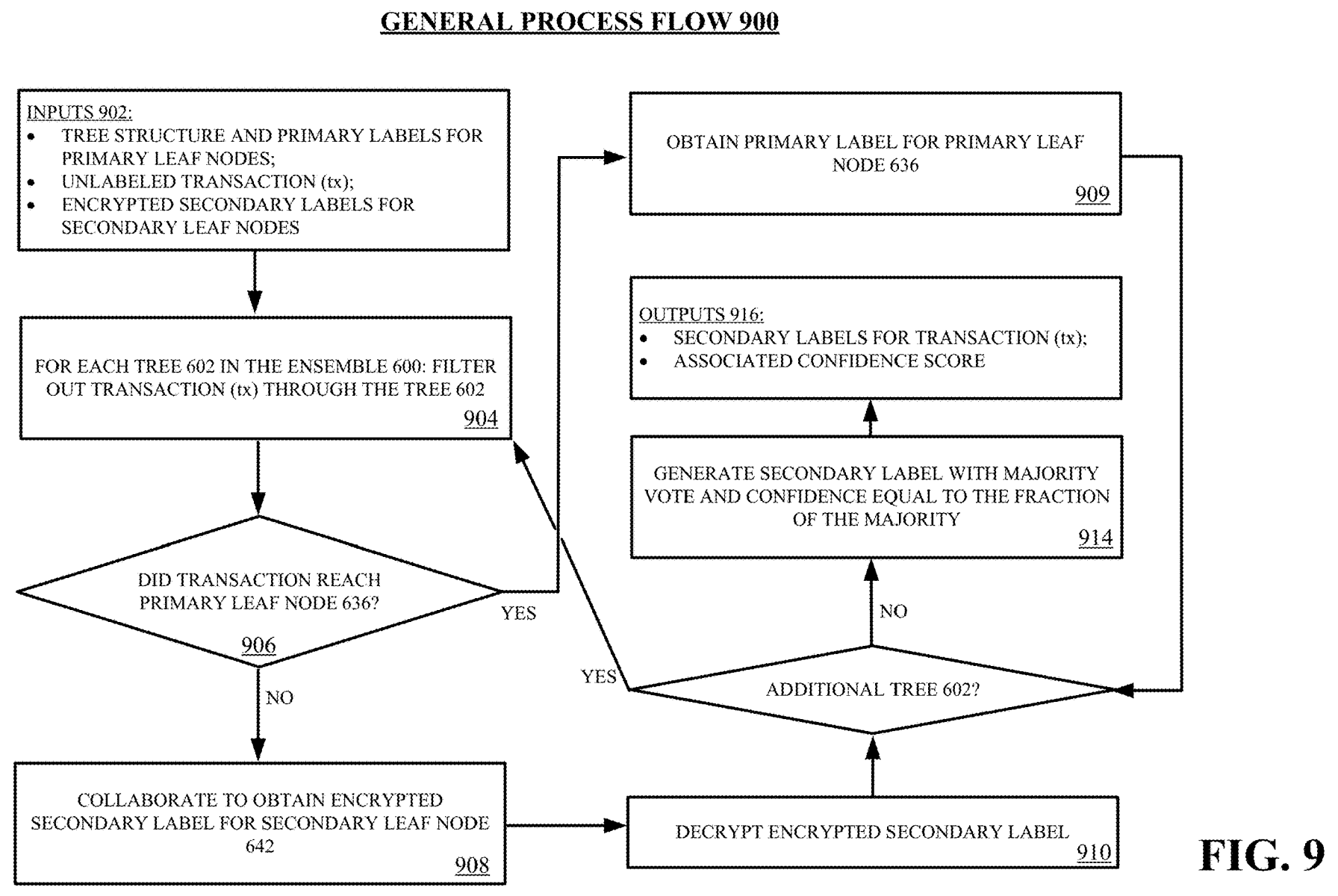

GENERAL PROCESS FLOW 900

INPUTS 902:
- TREE STRUCTURE AND PRIMARY LABELS FOR PRIMARY LEAF NODES;
- UNLABELED TRANSACTION (tx);
- ENCRYPTED SECONDARY LABELS FOR SECONDARY LEAF NODES

FOR EACH TREE 602 IN THE ENSEMBLE 600: FILTER OUT TRANSACTION (tx) THROUGH THE TREE 602 904

DID TRANSACTION REACH PRIMARY LEAF NODE 636? 906

YES

NO

COLLABORATE TO OBTAIN ENCRYPTED SECONDARY LABEL FOR SECONDARY LEAF NODE 642 908

OBTAIN PRIMARY LABEL FOR PRIMARY LEAF NODE 636 909

DECRYPT ENCRYPTED SECONDARY LABEL 910

ADDITIONAL TREE 602?

YES

NO

GENERATE SECONDARY LABEL WITH MAJORITY VOTE AND CONFIDENCE EQUAL TO THE FRACTION OF THE MAJORITY 914

OUTPUTS 916:
- SECONDARY LABELS FOR TRANSACTION (tx):
- ASSOCIATED CONFIDENCE SCORE

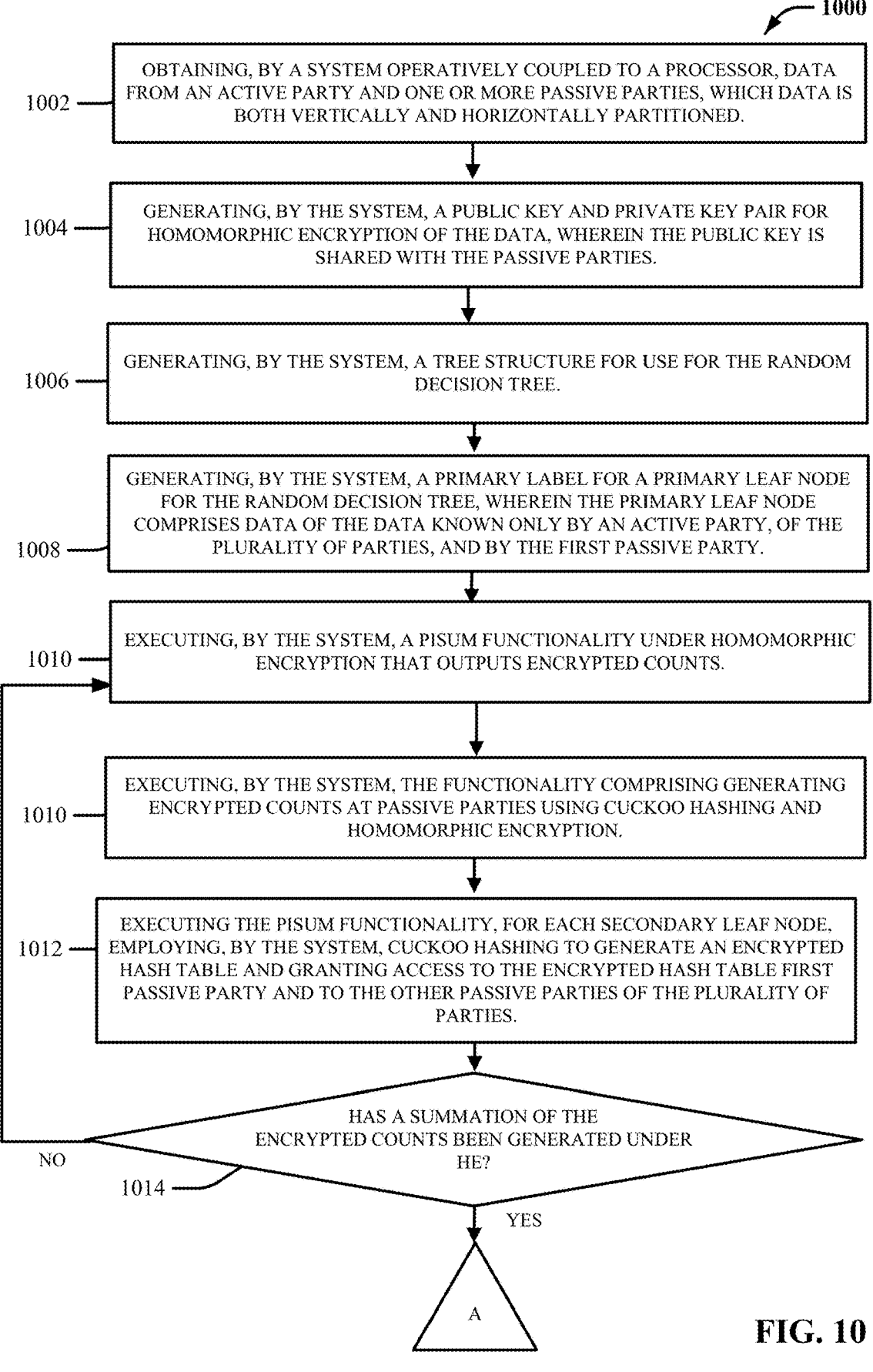

1000

1002 — OBTAINING, BY A SYSTEM OPERATIVELY COUPLED TO A PROCESSOR, DATA FROM AN ACTIVE PARTY AND ONE OR MORE PASSIVE PARTIES, WHICH DATA IS BOTH VERTICALLY AND HORIZONTALLY PARTITIONED.

1004 — GENERATING, BY THE SYSTEM, A PUBLIC KEY AND PRIVATE KEY PAIR FOR HOMOMORPHIC ENCRYPTION OF THE DATA, WHEREIN THE PUBLIC KEY IS SHARED WITH THE PASSIVE PARTIES.

1006 — GENERATING, BY THE SYSTEM, A TREE STRUCTURE FOR USE FOR THE RANDOM DECISION TREE.

1008 — GENERATING, BY THE SYSTEM, A PRIMARY LABEL FOR A PRIMARY LEAF NODE FOR THE RANDOM DECISION TREE, WHEREIN THE PRIMARY LEAF NODE COMPRISES DATA OF THE DATA KNOWN ONLY BY AN ACTIVE PARTY, OF THE PLURALITY OF PARTIES, AND BY THE FIRST PASSIVE PARTY.

1010 — EXECUTING, BY THE SYSTEM, A PISUM FUNCTIONALITY UNDER HOMOMORPHIC ENCRYPTION THAT OUTPUTS ENCRYPTED COUNTS.

1010 — EXECUTING, BY THE SYSTEM, THE FUNCTIONALITY COMPRISING GENERATING ENCRYPTED COUNTS AT PASSIVE PARTIES USING CUCKOO HASHING AND HOMOMORPHIC ENCRYPTION.

1012 — EXECUTING THE PISUM FUNCTIONALITY, FOR EACH SECONDARY LEAF NODE, EMPLOYING, BY THE SYSTEM, CUCKOO HASHING TO GENERATE AN ENCRYPTED HASH TABLE AND GRANTING ACCESS TO THE ENCRYPTED HASH TABLE FIRST PASSIVE PARTY AND TO THE OTHER PASSIVE PARTIES OF THE PLURALITY OF PARTIES.

1014 — HAS A SUMMATION OF THE ENCRYPTED COUNTS BEEN GENERATED UNDER HE?

NO

YES

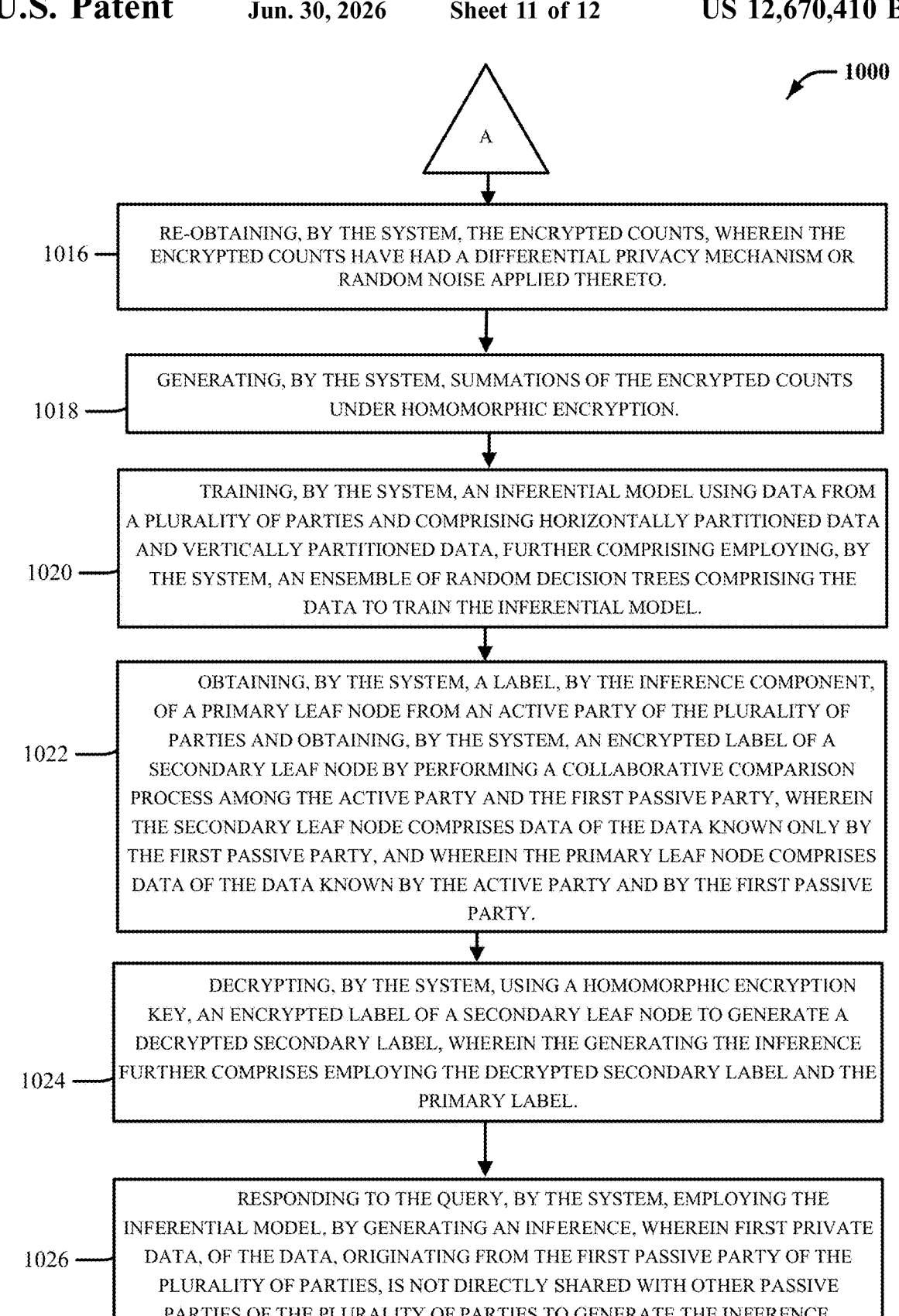

1000

A

1016 — RE-OBTAINING, BY THE SYSTEM, THE ENCRYPTED COUNTS, WHEREIN THE ENCRYPTED COUNTS HAVE HAD A DIFFERENTIAL PRIVACY MECHANISM OR RANDOM NOISE APPLIED THERETO.

1018 — GENERATING, BY THE SYSTEM, SUMMATIONS OF THE ENCRYPTED COUNTS UNDER HOMOMORPHIC ENCRYPTION.

1020 — TRAINING, BY THE SYSTEM, AN INFERENTIAL MODEL USING DATA FROM A PLURALITY OF PARTIES AND COMPRISING HORIZONTALLY PARTITIONED DATA AND VERTICALLY PARTITIONED DATA, FURTHER COMPRISING EMPLOYING, BY THE SYSTEM, AN ENSEMBLE OF RANDOM DECISION TREES COMPRISING THE DATA TO TRAIN THE INFERENTIAL MODEL.

1022 — OBTAINING, BY THE SYSTEM, A LABEL, BY THE INFERENCE COMPONENT, OF A PRIMARY LEAF NODE FROM AN ACTIVE PARTY OF THE PLURALITY OF PARTIES AND OBTAINING, BY THE SYSTEM, AN ENCRYPTED LABEL OF A SECONDARY LEAF NODE BY PERFORMING A COLLABORATIVE COMPARISON PROCESS AMONG THE ACTIVE PARTY AND THE FIRST PASSIVE PARTY, WHEREIN THE SECONDARY LEAF NODE COMPRISES DATA OF THE DATA KNOWN ONLY BY THE FIRST PASSIVE PARTY, AND WHEREIN THE PRIMARY LEAF NODE COMPRISES DATA OF THE DATA KNOWN BY THE ACTIVE PARTY AND BY THE FIRST PASSIVE PARTY.

1024 — DECRYPTING, BY THE SYSTEM, USING A HOMOMORPHIC ENCRYPTION KEY, AN ENCRYPTED LABEL OF A SECONDARY LEAF NODE TO GENERATE A DECRYPTED SECONDARY LABEL, WHEREIN THE GENERATING THE INFERENCE FURTHER COMPRISES EMPLOYING THE DECRYPTED SECONDARY LABEL AND THE PRIMARY LABEL.

1026 — RESPONDING TO THE QUERY, BY THE SYSTEM, EMPLOYING THE INFERENTIAL MODEL, BY GENERATING AN INFERENCE, WHEREIN FIRST PRIVATE DATA, OF THE DATA, ORIGINATING FROM THE FIRST PASSIVE PARTY OF THE PLURALITY OF PARTIES, IS NOT DIRECTLY SHARED WITH OTHER PASSIVE PARTIES OF THE PLURALITY OF PARTIES TO GENERATE THE INFERENCE.

FIG. 11

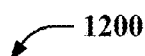

1200

COMPUTER 1201

PROCESSOR SET 1210

| PROCESSING CIRCUITRY 1220 | CACHE 1221 |

COMMUNICATION FABRIC 1211

VOLATILE MEMORY 1212

PERSISTENT STORAGE 1213

OPERATING SYSTEM 1222

INFERENTIAL MODEL TRAINING CODE

1280

PERIPHERAL DEVICE SET 1214

| UI DEVICE SET 1223 | STORAGE 1224 | IoT SENSOR SET 1225 |

NETWORK MODULE 1215

WAN 1202

END USER DEVICE 1203

REMOTE SERVER 1204

REMOTE DATABASE 1230

PRIVATE CLOUD 1206

GATEWAY 1240

PUBLIC CLOUD 1205

| CLOUD ORCHESTRATION MODULE 1241 | HOST PHYSICAL MACHINE SET 1242 |
| VIRTUAL MACHINE SET 1243 | CONTAINER SET 1244 |

FIG. 12

PRIVACY ENHANCED FEDERATED TRAINING AND INFERENCE OVER VERTICALLY AND HORIZONTALLY PARTITIONED DATA

TECHNICAL FIELD

The present disclosure relates to analysis of private data, and more specifically to employing a framework for federated training and subsequent inference over data that is both vertically partitioned and horizontally partitioned.

BACKGROUND

Data, such as partitioned data and/or graph data, can be used in existing data analytics processes in areas of finance, social networking and healthcare, among other areas. The data can be used, for instance, to train models, such as inferential models, for clinical artificial intelligence, medical diagnosis, financial evaluation and social networking prediction, among other purposes. The data can comprise information that is considered private and should not be directly shared based on personal choice, contract, regulation or law.

In existing frameworks, maintaining privacy of private data comprising such private information can be fraught with difficulty, particularly in areas were federated training in employed between two or more entities. While existing frameworks can analyze vertically partitioned data or horizontally partitioned data separately, such analysis still results in privacy concerns. That is, existing frameworks are not compatible for federated training, while maintaining privacy of data, let alone for such federated training using data that is both vertically partitioned and horizontally partitioned. That is, using existing frameworks, privacy of data will not be protected or implemented during federated training or during inferential output using a model trained by such federated training.

SUMMARY

The following presents a summary to provide a basic understanding of one or more embodiments described herein. This summary is not intended to identify key or critical elements, and/or to delineate scope of particular embodiments or scope of claims. Its sole purpose is to present concepts in a simplified form as a prelude to the more detailed description that is presented later. In one or more embodiments, systems, computer-implemented methods, apparatuses and/or computer program products described herein can provide a process to employ federated training to train a model on data that is both vertically partitioned and horizontally partitioned without compromising privacy of private data comprised by the data. Likewise, the one or more embodiments, systems, computer-implemented methods, apparatuses and/or computer program products described herein can employ the resultant trained model to output an inference in response to a query, again without compromising privacy of private data comprised by data input to the model.

In accordance with an embodiment, a system can comprise a memory that stores computer executable components, and a processor that executes the computer executable components stored in the memory, wherein the computer executable components can comprise a modeling component that trains an inferential model using data from a plurality of parties and comprising horizontally partitioned data and vertically partitioned data, wherein the modeling component employs a random decision tree comprising the data to train the inferential model, and an inference component that responds to a query, employing the inferential model, by generating an inference, wherein first party private data, of the data, originating from a first passive party of the plurality of parties, is not directly shared with other passive parties of the plurality of parties to generate the inference.

In accordance with another embodiment, a computer-implemented method can comprise training, by a system operatively coupled to a processor, an inferential model using data from a plurality of parties and comprising horizontally partitioned data and vertically partitioned data, employing, by the system, a random decision tree comprising the data to train the inferential model, and responding to a query, by the system, employing the inferential model, by generating an inference, wherein first party private data, of the data, originating from a first passive party of the plurality of parties, is not directly shared with other passive parties of the plurality of parties to generate the inference.

The computer program product can comprise a computer readable storage medium having program instructions embodied therewith, the program instructions executable by a processor to cause the processor to train, by the processor, an inferential model using data from a plurality of parties and comprising horizontally partitioned data and vertically partitioned data, employ, by the processor, a random decision tree comprising the data to train the inferential model, and respond to a query, by the processor, to a query, employing the inferential model, by generating an inference, wherein first party private data, of the data, originating from a first passive party of the plurality of parties, is not directly shared with other passive parties of the plurality of parties to generate the inference.

An advantage of the above-indicated system, computer-implemented method and/or computer program product can be providing for maintaining of privacy of private information of a database during any one or more of federated training of an inferential model or use of an inferential model to respond to a query. That is, although the inferential model can be employed by a plurality of entities and/or shared, use of the inferential model does not result in exposure of private data. This can be useful in the fields of healthcare, finances and/or social networking where maintaining privacy of data can be desired, contracted and/or legally regulated.

Another advantage of the above-indicated system, computer-implemented method and/or computer program product can be an ability to train an inferential model employing privacy limitations where the inferential model can be employed representatively as a machine-learning-as-a-service. That is, an administrator entity using system, method and/or computer program product detailed herein can aggregate data and/or trained models, using federated training, to return an trained model without having directly accessed the private data of parties. Likewise, passive entities using the system, method and/or computer program, and having private data that contributed to the inferential model, can employ the inferential model absent private data of any one passive entity being directly shared with any other passive entity.

Another advantage of the above-indicated system, computer-implemented method and/or computer program product can be the incorporation of differential privacy (DP) mechanisms to protect privacy during inference using the inferential model, but without compromising accuracy. That is, DP can be a principled method to defend against inference-time attacks such as membership inference attacks. Use of DP can allow for a favorable privacy-vs-utility trade-off.

Another advantage of the above-indicated system, computer-implemented method and/or computer program product can be the ability to train the inferential model on complex features, such as, but not limited to, features derived from transaction data, but without compromising the privacy of private data comprised by the transaction data.

DESCRIPTION OF THE DRAWINGS

FIG. 4 provides an illustration of a multi-record alignment that can be performed by the non-limiting system of FIG. 2, in accordance with one or more embodiments described herein.

FIG. 9 illustrates a flow diagram of one or more processes that can be performed by the non-limiting system of FIG. 2, in accordance with one or more embodiments described herein.

FIG. 10 illustrates a flow diagram of one or more processes that can be performed by the non-limiting system of FIG. 2, in accordance with one or more embodiments described herein.

FIG. 11 illustrates a continuation of the flow diagram of FIG. 10 of one or more processes that can be performed by the non-limiting system of FIG. 2, in accordance with one or more embodiments described herein.

FIG. 12 illustrates a block diagram of example, non-limiting, computer environment in accordance with one or more embodiments described herein.

DETAILED DESCRIPTION

Figure 1:
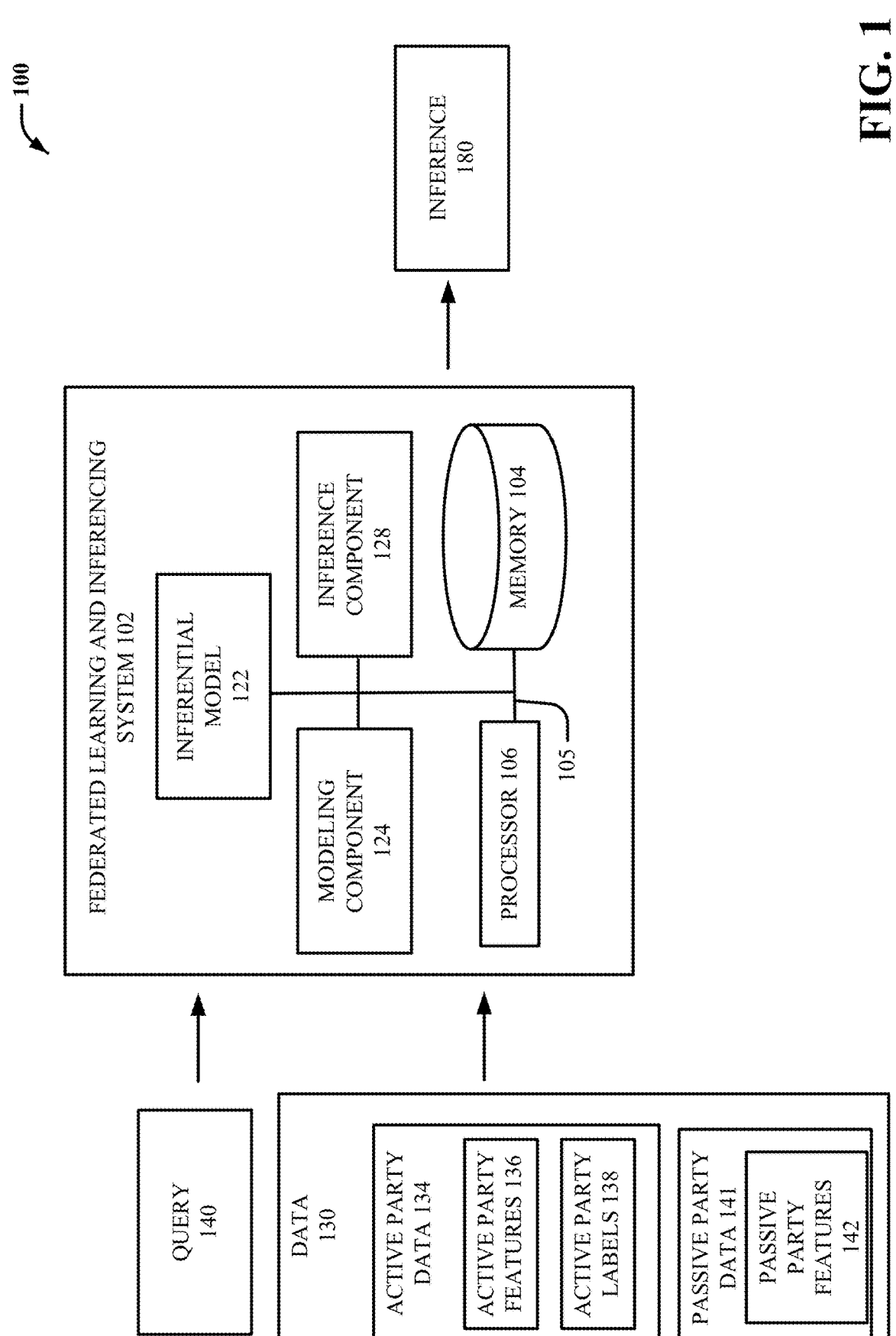
FIG. 1 illustrates a block diagram of an example, non-limiting system that can provide a process to use federated training to train a machine learning model and provide inference, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A goal of private data analysis (e.g., of data identified as private and not to be shared) can be to train a model, such as by federated learning, on the respective data and to employ the trained model to provide an inference in response to a query to the model. The goal further can comprise preventing direct access (e.g., facilitating use without private data exposure) by a user of the trained model to private data (e.g., data comprising private information). These goals can be desirable in various environments including, but not limited to, social networking forecasting, healthcare forecasting, financial forecasting, social influence forecasting and/or commercial trend forecasting. One or more examples provided herein are in the field of financial crimes analysis, but are not limited thereto.

To perform such forecasting, data is often used in existing data analytics processes. The data typically comprises data from a plurality of nodes (e.g., records, individuals, participants and/or entities). The data that is existingly used can be either vertically partitioned or horizontally partitioned. However, notably, existing data analytics processes cannot ensure data privacy with use of data that is both vertically partitioned and horizontally partitioned. Further, existing data analytics processes generally assume that training samples are already aligned or are limited to one-to-one alignment. In particular, these approaches do not consider the fact that some parties may have data aligned horizontally among them, while another party may have data vertically aligned. That is, existing approaches are not appropriate to train a model without data leakage. This leakage can be undesirable let alone counter to a contract, regulation and/or law.

To account for one or more of these deficiencies of existing frameworks (e.g., data analytics processes), one or more embodiments are described herein that can employ a database, which can comprise data comprising private information, to train an inferential model using federated training and to subsequently employ the model to provide an output inference in response to a query.

Figure 3:
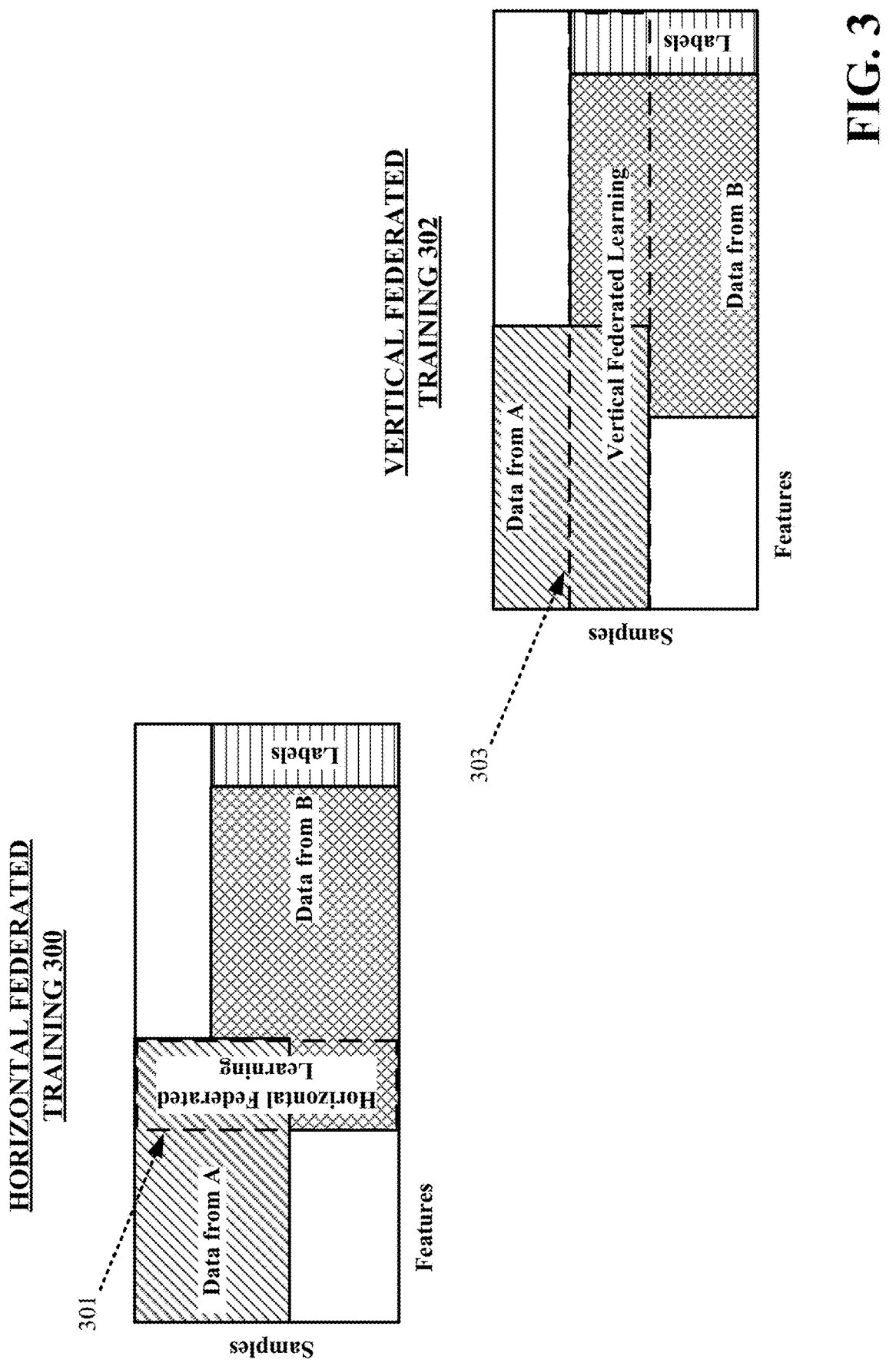
FIG. 3 provides a pair of graphs illustrating horizontal federate training and vertical federated training that can be performed by the non-limiting system of FIG. 2, in accordance with one or more embodiments described herein.

The inferential model can be an inferential model, decision tree model, predictive model and/or other type of model that can analyze and handle complex data that is vertically partitioned and horizontally partitioned and which has multi-record alignment (as compared to one-to-one alignment). Turning briefly to FIG. 3, using the horizontal partitioning of the data, horizontal federated learning can be performed, and using the vertical partitioning of the data, vertical federated learning can be performed. These aspects can be performed in any suitable order and both are performed by the federated learning and inferencing systems described herein (e.g., 102 and 202 to be described below in detail).

As illustrated at FIG. 3, 300, horizontal federated learning can refer to training based on horizontal partitioning, where the same feature is shared/learned (e.g., represented by the dotted-line box) across all nodes (e.g., A and B). For example, images for classification can be a same feature. As shown, horizontal federated learning (dotted box 301)

extends across rows of each of nodes A and B. However, sample space is not shared, and different training examples can be employed with only one node having the labels, initially.

Also as illustrated at FIG. 3, 302, vertical federated learning can refer to training based on vertical partitioning, where the same sample space is shared/earned (e.g., represented by the dotted-line box 303) across all nodes (e.g., A and B). For example, the same nodes (e.g., individuals) can comprise a shared sample space. However, feature space is not shared, and different feature spaces (e.g., hospital database, bank database, insurance database) can be employed for each node. Only one node has the labels, initially. Overall examples can comprise medical information and financial data.

Turning next briefly to FIG. 4, an exemplary multi-record alignment 400 is illustrated. Multi-record alignment can refer to alignment of multiple rows of one node/party being aligned to same row of another node/party. That is, the rows in one node/record can be ordered in a different way than the rows in second node/record, prior to multi-record alignment. In the illustrated multi-record alignment 400, the first party 401 has rows ordered according to a first column, which is ID. The second party 402 has rows ordered according to a respective first column, which is Account ID. Notably, the Account ID column of the second party 402 and the ID column of the first party 401 have many of the same values, but use different column titles. Performing multi-record alignment can result in rows of the first party 401 being tagged (e.g., aligned) to rows of the second party 402. A row of the second party 402 can be aligned with more than one row of the first party 401, as shown, and/or vice versa.

In accordance with FIGS. 3 and 4, it is generally illustrated that data for use in federated training of a model and subsequent inference can comprise first data of a first party and second data of a second party. The first data and the second data each can comprise private information. A third party can be an entity requesting federating training and/or submitting a query and requesting an output inference. The database can additionally comprise public data, such as data not considered to be private data.

A query can comprise any request for information such as a forecasting request. As one example, a hospital or administrative unit entity with access to user contact information can desire to learn a forecasting model for pandemic forecasting. As another example, a non-profit organization entity with access to private data of its user can desire to learn a forecasting model for influencing direction of its members. As another example, a financial entity can wish to generate a federated trained inference model to determine mortgage default patterns or fraud patterns. As another example, a group of financial entities can look to collaborate with one another and with a third party entity having financial transaction data, or with a regulator, to train an anomaly detection model, for example to search for money laundering evidence.

Turning now, a database can be employed, along with privacy-enhancing techniques of a federated training and inference system defined herein to train an inferential model, such as an inferential machine learning (ML) model. The inferential model can then be shared with various entities, can be further trained, using federated training, based on one or more additional datasets, and thus can be a public inferential model. Even though the inferential model can be public and can be based (e.g., trained) at least partially on private data, the federated training and inference system embodiments described herein can train the inferential model in such a way that training data can comprise vertically partitioned data and horizontally partitioned data, while privacy of the private data is ensured. For example, leakage of private data can be greatly reduced as compared to existing techniques and/or altogether prevented with respect to use of the inferential model.

In one or more cases Internet of Things (IOT) can be employed to train an inferential model due to the privacy-enhanced federated training procedures discussed herein and employed by the one or more embodiments described herein. In one or more cases plurality of consortiums that want to learn a collaborative model but do not want to share their data can employ the one or more embodiments described herein. The private data can be retained and only federated trained model shared. Furthermore, the one or more embodiments described herein can be useful in cases where only a single entity has labeling for the data, which can be common in regulated environments such as banking.

Upon training of the inferential model, the inferential model can be retrieved and employed to respond to one or more queries by providing one or more inferences based on the database. Retraining of the inferential model can be performed at any suitable frequency based on changes to the database, based on addition of another database and/or based on one or more outputs of the inferential model which can be employed as historical data by the inferential model.

Generally, one or more processes that can be employed by the federated learning and inferencing systems described herein, to train an inferential model and to ensure privacy of private data on which the inferential model is based, can include the following, but are not limited to these processes only: generating tree structures, generating labels for primary leaf nodes, employing homomorphic encryption, employing a differential privacy mechanism, executing a PISum functionality (e.g., comprising generating encrypted counts at passive parties), collaborating to generate labels for secondary (e.g., non-primary) leaf nodes, decrypting an encrypted secondary label, and outputting an inference and associated confidence score. These processes will each be described below in detail. These processes can provide for a combination of privacy techniques, scalability of deployment, and extensibility to new features making the one or more embodiments described herein useful for deployment in a variety of fields.

In an exemplary case, in the financial fields, effective detection of evidence of financial crimes generally employs collaboration among multiple entities, each having a respectively diverse set of data, such as financial messaging services and banks in a sub-field of financial crimes prevention. Trust among these entities can be limited by regulation, law and/or competition. However, all can be aligned in a general desire to improve the detection and prevention of suspicious transaction anomalies. Federated learning (FL), in particular vertical FL (VFL), can enable entities to collaboratively train an inferential model such as an automated anomaly detection model. However, the data employed in such sub-field is often partitioned both vertically and horizontally, thus preventing effective us of existing VFL approaches in a plug-and-play manner.

Rather, one or more embodiments described herein, can provide federated training of such an ML model employing training data that is both horizontally partitioned and vertically partitioned. It is noted that while examples relative to FIGS. 1, 2 and 5-13 employ one or more examples in the financial fields, as noted above, the one or more embodiments described herein are more widely applicable both in and outside of the financial fields. Other examples of fields of use can include, but are not limited to, healthcare, social networking and lobbying.

The one or more embodiments described herein can combine fully homomorphic encryption, secure multi-party computation (SMPC), differential privacy (DP), and randomization techniques to balance privacy and accuracy during federated training and to prevent inference threats at time of model deployment time. For example, banks can employ a system described herein without learning any sensitive features about financial messaging transactions and financial messaging services can employ a system described herein while learn only noisy aggregate statistics of bank features. Private data of nodes can be retained and not directly shared by any entity employing a system described herein. Also provided by one or more systems described herein, a DP mechanism can protect output privacy during inference (e.g., during use of a trained inferential model).

Put another way, the one or more embodiments described herein can generate high-utility models by significantly reducing the per-entity (e.g., per-bank) noise level while satisfying distributed DP. To ensure high accuracy, an ensemble model can be produced, such as employing a random forest approach. This can enable the one or more systems described herein to take advantage of properties of ensembles to reduce variance and increase accuracy. The one or more embodiments further can mitigate potential loss in accuracy due to DP techniques by taking advantage of random sampling and boosting techniques that select subsets of data samples to train an inferential model. Furthermore, the ensemble model (e.g., inferential model) can be built considering different and complex phenomena required for field-specific rules (e.g., financial crimes detection). For example, relative to financial fields, database analysis algorithms can be employed to extract transaction patterns associated with money laundering and other crimes and provide them as features for training of an inferential model

Terminology

As used herein, the terms "entity," "requesting entity," and "user entity" can refer to a machine, device, component, hardware, software, smart device, party, organization, individual and/or human.

As used herein, the term "party" refers to an entity.

As used herein, the term "private" can refer to an aspect that is not to be shared with other entities.

As used herein, the term "private data" can comprise the "first data" and thus can comprise "first party information" considered as private.

Description

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in various cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein.

Figure 2:
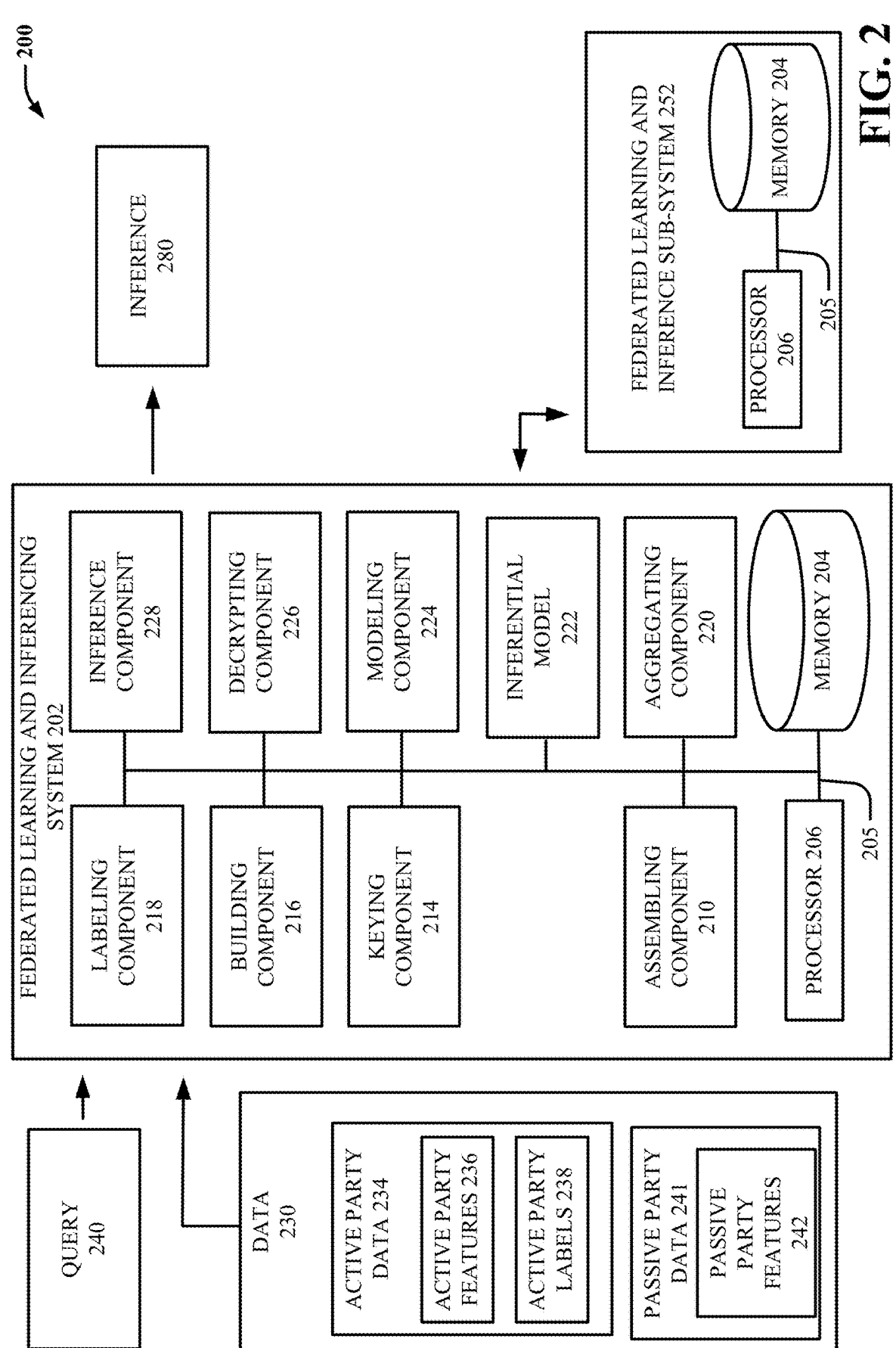
FIG. 2 illustrates a block diagram of another example, non-limiting system that can provide a process to use federated training to train a machine learning model and provide inference, in accordance with one or more embodiments described herein.

For example, in one or more embodiments, the non-limiting systems 100 and/or 200 illustrated at FIGS. 1 and 2, and/or systems thereof, can further comprise one or more computer and/or computing-based elements described herein with reference to a computing environment, such as the computing environment 1200 illustrated at FIG. 12. In one or more described embodiments, computer and/or computing-based elements can be used in connection with implementing one or more of the systems, devices, components and/or computer-implemented operations shown and/or described in connection with FIGS. 1 and/or 2 and/or with other figures described herein.

Turning now in particular to one or more figures, and first to FIG. 1, the figure illustrates a block diagram of an example, non-limiting system 100 that can facilitate a process to train an inferential model and to employ the inferential model to output an inference, where the training and inferencing are executed a federated learning and inferencing system 102.

The non-limiting system 100 can comprise data 130 (e.g., of a database) and the federated learning and inferencing system 102.

It is noted that the federated learning and inferencing system 102 is only briefly detailed to provide but a lead-in to a more complex and/or more expansive federated learning and inferencing system 202 as illustrated at FIG. 2. That is, further detail regarding processes that can be performed by one or more embodiments described herein will be provided below relative to the non-limiting system 200 of FIG. 2.

Still referring to FIG. 1, the data 130 can comprise active party data 134 which can comprise active party features 136, which active party features 136 can comprise data considered to be and/or identified as private. In one or more cases, the active party data 134 further can comprise active party labels 138 corresponding to the active party features 136. Thus, the data 130 comprises private data. The active party features 136 can be known to an active party and to at least one passive party, referred to herein as a first passive party. Passive party data 141 from one or more other parties can be comprised by the data 130. The passive party data 141 can comprise passive party features 142, which passive party features 142 can comprise data considered to be and/or identified as private. The passive party features 142 can be known only to an individual, respective passive party, such as the first passive party. In one or more embodiments, the data 130 further can comprise public data (e.g., data considered not to be private to any party).

The federated learning and inferencing system 102 (FLIS 102) can comprise at least a memory 104, bus 105, processor 106, modeling component 124, inferential model 122 and inference component 128. Using these components, the federated learning and inferencing system 102 can output an inference 180 based on the data 130, where the inference 180 does not expose the first party information of the passive party data 141 to a user entity of the federated learning and inferencing system 102 (e.g., a recipient of the inference 180) or to a secondary party, other than the first party.

The modeling component 124 can generally train an inferential model 122 using data 130 from a plurality of parties and comprising horizontally partitioned data and vertically partitioned data, wherein the modeling component 124 employs an ensemble of random decision trees comprising the data 130 to train the inferential model 122. It is noted that while the inferential model 122 is illustrated as comprised by the FLIS 102, the inferential model 122 can be external to the FLIS 102 but accessible to the FLIS 102.

The inference component 128 generally can respond to a query 140, employing the inferential model 122, by generating an inference 180, wherein first party private data (e.g., passive party data 141), of the data 130, originating from a first party (e.g., passive party) of the plurality of parties, is not directly shared with other passive parties of the plurality of parties to generate the inference 180.

The modeling component 124, inference component 128 and inferential model 122 can be operatively coupled to a processor 106 which can be operatively coupled to a memory 104. The bus 105 can provide for the operative coupling. The processor 106 can facilitate execution of the modeling component 124, inference component 128 and inferential model 122. The modeling component 124, inference component 128 and inferential model 122 can be stored at the memory 104.

The inferential model 122 can comprise and/or can be comprised by a classical model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, self-supervised, semi-supervised and/or unsupervised. For example, the inferential model 122 can be and/or can comprise an ML model.

Figure 5:
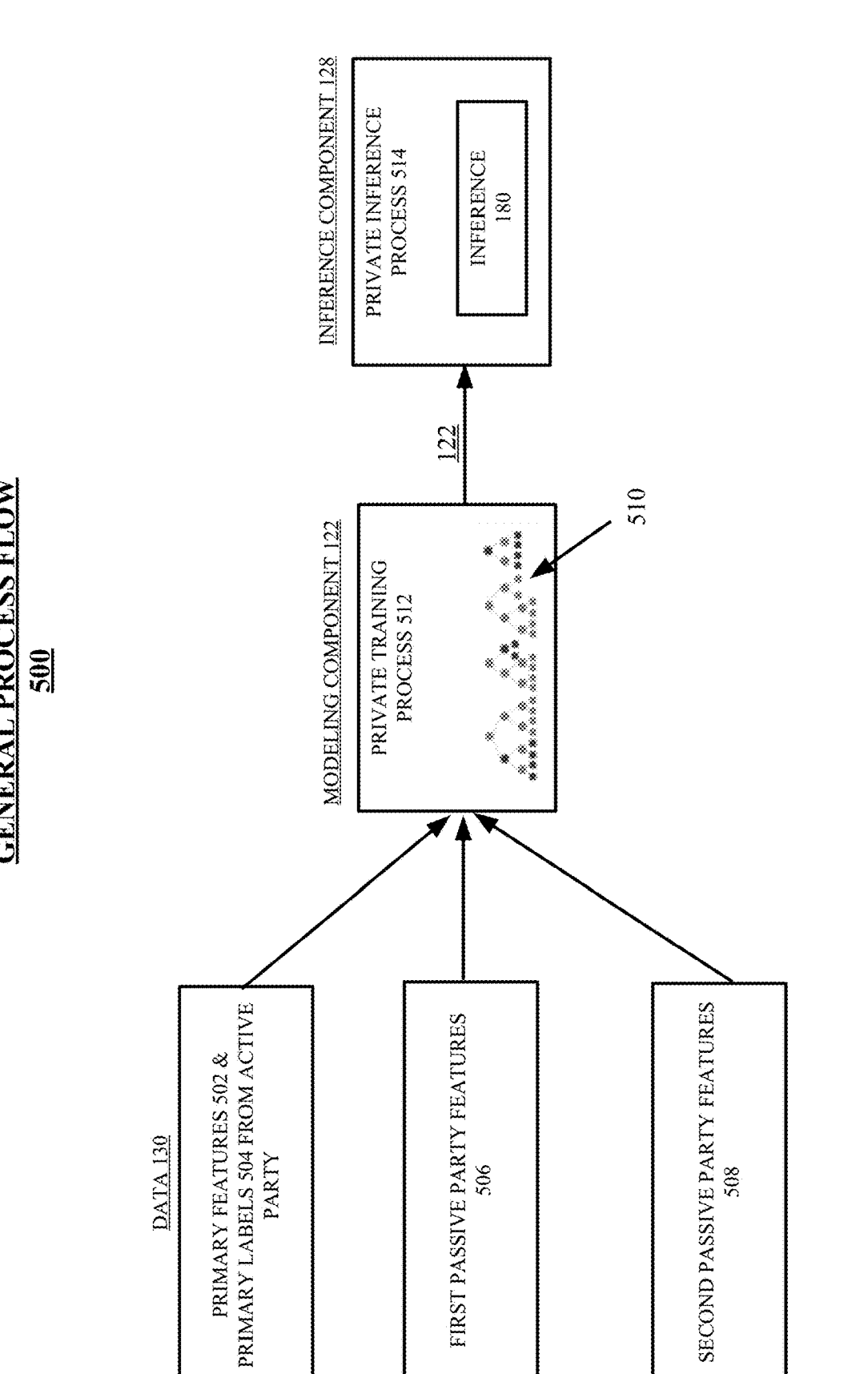
FIG. 5 illustrates a block flow diagram of example processes for training a machine learning model and providing inferencing, employing the non-limiting system of FIG. 2, in accordance with one or more embodiments described herein.

Turning briefly to the general process flow 500 of FIG. 5, and still referring to FIG. 1, the data 130 can comprise primary features 502 and primary labels 504 from an active party (e.g., non-passive party). The data 130 likewise can comprise first passive party features 506 from a first passive party and second passive party features 508 from a second passive party. It is noted that these features, parties and labels are discussed in greater detail with respect to the embodiment of FIG. 2. As noted above, this data 130 can be employed by the modeling component 124 to generate an ensemble 510 of random decision trees during a private training process 512. Using the inferential model 122, the inference component 128 can perform a private inference process 514, as noted above, to output an inference 180.

Turning next to FIG. 2, a non-limiting system 200 is illustrated that can comprise a federated learning and inferencing system 202 (FLIS 202). Repetitive description of like elements and/or processes employed in respective embodiments is omitted for sake of brevity. Description relative to an embodiment of FIG. 1 can be applicable to an embodiment of FIG. 2. Likewise, description relative to an embodiment of FIG. 2 can be applicable to an embodiment of FIG. 1.

The non-limiting system 200 generally can comprise the FLIS 202, data 230 of a database, and a federated learning and inference sub-system 252.

The data 230 can comprise data from an active party and from at least one passive party. An active party can be one that shares data, including private data, for which labels are shared at least with the FLIS 202. The active party data 234 of the active party can be data known by the active party and by a respective, individual passive party. Regarding any one aspect of active party data 234, such as an active party features 236, the underlying data is known only by the active party and by a respective, individual passive party. That is, the active party can be referred to as "active" due to being a party that receives, obtains and/or aggregates data from one or more passive parties. Likewise, the passive party can be referred to as "passive" due to being a party that generally merely provides a sub-set of features, without labels, to the active party and/or the FLIS 202. It is noted that not all data of the one or more passive parties is shared with the active party. And thus not all data of a passive party becomes active party data 234.

As an example, in a financial arena embodiment, an active party can be a messaging and/or transaction service used by banks to perform financial transactions. A plurality of banks can be a plurality of passive parties. Both the banks and the transaction service can be interested in analysis of transaction data. However, the transaction service can be privy only to some data of the banks, and the banks can be privy only to their own private data. Further, the banks can have shared only some of their private data with the transaction service (e.g., the transaction service can be privy only to some data of the banks, as noted above). An example of such transaction data can be, but it is not limited to, a transaction id or account part of the transaction. The banks, each individually, can be concerned with maintaining privacy of their respective private data, and the active party can be likewise concerned with maintaining privacy of all private data received form the banks, such that private data of each individual bank is not shared directly with any other bank.

Turning back to the general non-limiting system 200, applicable to the aforementioned financial arena embodiment and to a plurality of embodiments in other arenas, data 230 can also comprise passive party data 241 that can be data known only by each individual passive party. That is, for each aspect of passive party data 241, such as a passive party feature 242, only a respective, individual passive party can be privy to this data.

Put another way, and referring specifically to the data 230 diagram at FIG. 2, the data 230 can comprise active party data 234 which can comprise active party features 236, which active party features 236 can comprise data considered to be and/or identified as private. In one or more cases, the active party data 234 further can comprise active party labels 238 corresponding to the active party features 236. Thus, the data 230 comprises private data. The active party features 236 can be known to an active party and to at least one passive party, referred to herein as a first passive party. Passive party data 241 from one or more other parties can be comprised by the data 230. The passive party data 241 can comprise passive party features 242, which passive party features 242 can comprise data considered to be and/or identified as private. The passive party features 242 can be known only to an individual, respective passive party, such as the first passive party. In one or more embodiments, the data 230 further can comprise public data (e.g., data considered not to be private to any party).

Turning briefly to the federated learning and inferencing sub-system (FLISS) 252, comprised can be at least a process 256 and memory 254 communicatively coupled to one another by a bus 255. The FLISS 252 can be comprised by a passive party. In one or more embodiments, any one or more of the components of the FLIS 202 can be duplicated at an FLISS 252 of a passive party.

One or more communications between one or more components of the non-limiting system 200 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The federated learning and inferencing system 202 can be associated with, such as accessible via, a cloud computing environment.

The federated learning and inferencing system 202 can comprise a plurality of components. The components can comprise a memory 204, processor 206, bus 205, assembling component 210, keying component 214, building component 216, labeling component 218, aggregating component 220, inferential model 222, modeling component 224, decrypting component 226 and inference component 228. Using these components, the federated learning and inferencing system 202 can output an inference 280 based on the data 230 and in response to a query 240, where the inference 280 does not expose the first party information of passive party data 241 to a user entity of the federated learning and inferencing system 202 (e.g., a recipient of the inference 280) or to a secondary party. The query 240 can be requested by an entity, such as an active party, that is not privy to the passive party features 142, but is privy to at least a portion of the active party features 136. Alternatively, the query 240 can be requested by an entity, such as a third party entity, that is not privy to any of the passive party features 142 or active party features 136.

Discussion next turns briefly to the processor 206, memory 204 and bus 205 of the federated learning and inferencing system 202. For example, in one or more embodiments, the federated learning and inferencing system 202 can comprise the processor 206 (e.g., computer processing unit, microprocessor, classical processor, quantum processor and/or like processor). In one or more embodiments, a component associated with federated learning and inferencing system 202, as described herein with or without reference to the one or more figures of the one or more embodiments, can comprise one or more computer and/or machine readable, writable and/or executable components and/or instructions that can be executed by processor 206 to provide performance of one or more processes defined by such component and/or instruction. In one or more embodiments, the processor 206 can comprise the assembling component 210, keying component 214, building component 216, labeling component 218, aggregating component 220, inferential model 222, modeling component 224, decrypting component 226 and inference component 228.

In one or more embodiments, the federated learning and inferencing system 202 can comprise the computer-readable memory 204 that can be operably connected to the processor 206. The memory 204 can store computer-executable instructions that, upon execution by the processor 206, can cause the processor 206 and/or one or more other components of the federated learning and inferencing system 202 (e.g., assembling component 210, keying component 214, building component 216, labeling component 218, aggregating component 220, inferential model 222, modeling component 224, decrypting component 226 and inference component 228) to perform one or more actions. In one or more embodiments, the memory 204 can store computer-executable components (e.g., assembling component 210, keying component 214, building component 216, labeling component 218, aggregating component 220, inferential model 222, modeling component 224, decrypting component 226 and inference component 228).

The federated learning and inferencing system 202 and/or a component thereof as described herein, can be communicatively, electrically, operatively, optically and/or otherwise coupled to one another via a bus 205. Bus 205 can comprise one or more of a memory bus, memory controller, peripheral bus, external bus, local bus, quantum bus and/or another type of bus that can employ one or more bus architectures. One or more of these examples of bus 205 can be employed. In one or more embodiments, the federated learning and inferencing system 202 can be coupled (e.g., communicatively, electrically, operatively, optically and/or like function) to one or more external systems (e.g., a non-illustrated electrical output production system, one or more output targets and/or an output target controller), sources and/or devices (e.g., classical and/or quantum computing devices, communication devices and/or like devices), such as via a network. In one or more embodiments, one or more of the components of the federated learning and inferencing system 202 and/or of the non-limiting system 200 can reside in the cloud, and/or can reside locally in a local computing environment (e.g., at a specified location).

In addition to the processor 206 and/or memory 204 described above, the federated learning and inferencing system 202 can comprise one or more computer and/or machine readable, writable and/or executable components and/or instructions that, when executed by processor 206, can provide performance of one or more operations defined by such component and/or instruction.

Turning now to the additional components of the federated learning and inferencing system 202 (e.g., assembling component 210, keying component 214, building component 216, labeling component 218, aggregating component 220, inferential model 222, modeling component 224, decrypting component 226 and inference component 228), generally, the federated learning and inferencing system 202 can generate and/or train the inferential model 222, which can then be employed by the federated learning and inferencing system 202 to output an inference 280 in response to a query 240. It is noted that while the inferential model 222 is illustrated as being comprised by the federated learning and inferencing system 202, in one or more other embodiments, the inferential model 222 can be external to, but accessible by, the federated learning and inferencing system 202.

Turning first to the assembling component 210, the assembling component 212 can generally identify, search, receive, transfer and/or otherwise obtain the data 230 from an active party and from one or more passive parties, such as from a first passive party. As illustrated at FIG. 3, the data 230 can comprise data that is both vertically partitioned and horizontally partitioned, e.g., where data A originates from an active party and data B originates from a passive party, such as a first passive party. That is data A can be both vertically partitioned and horizontally partitioned and/or data B can be both vertically partitioned and horizontally partitioned. As a result, features of the data can be complex and/or connections between features can be complex. Indeed, some features (e.g., passive party features 242) can be known by only individual passive parties, where other features (e.g., active party features 236) can be known by an active party and by one or more passive parties.

In one or more embodiments, data from at least of the active party or passive parties can comprise data that is only vertically partitioned or only horizontally partitioned.

In one or more embodiments, it is noted that at least one of the active party or at least one passive party can generate its own features, respectively $F_A$ for active party features and $F_P$ for passive party features.

Next, the keying component 214 can generally generate a public key and private key pair for homomorphic encryption of the data, wherein the keying component 214 can share and/or grant access to the passive parties (e.g., the first passive party) to the public key. The keying component 214 also can share the private key with the active party.

It is worth noting that in one or more embodiments, the active party can control and/or have access to the FLIS 202 and thus "sharing" between the FLIS 202 and the active party can be at least partially inherent. As such, one or more components operating at the FLIS 202 and/or one or more processes operating at the FLIS 202 can broadly be referred to as being operating at and/or by the active party.

In one or more other embodiments, the FLIS 202 can be operated by a third party, such as a third party having a privacy contract, agreement, regulations, etc. with the active party and the passive parties that are participating in sharing their respective party data (234, 241). In such case, additional encryption can be employed, in addition to that discussed below, during transfer of data, labels and/or the like among the active party, passive parties and third party aggregator system (e.g., comprising the FLIS 202).

In one or more embodiments, the active party and/or the FLIS 202 can preprocess the data, here serving as training data for training the inferential model 222, by extracting one or more features (e.g., active party features 236 and/or passive party features 242) and handling any class imbalance of the features. Pre-processing can comprise, without being limited thereto, normalizing the features or applying other mathematical operation, subsampling data by using only a subset of features available, first generating a graph and extracting the features, generating an embedding from available data, augmenting the private data, and/or any combination thereof.

Next, the building component 216 can generally generate one or more tree structures for use as structure for an ensemble of random decision trees to be loaded by the building component 216 and the labeling component 218. In one or more embodiments, the structure of one or more such decision trees can be randomly generated to help reduce the amount of DP noise injected at a later step, to be discussed below.

Figure 6:
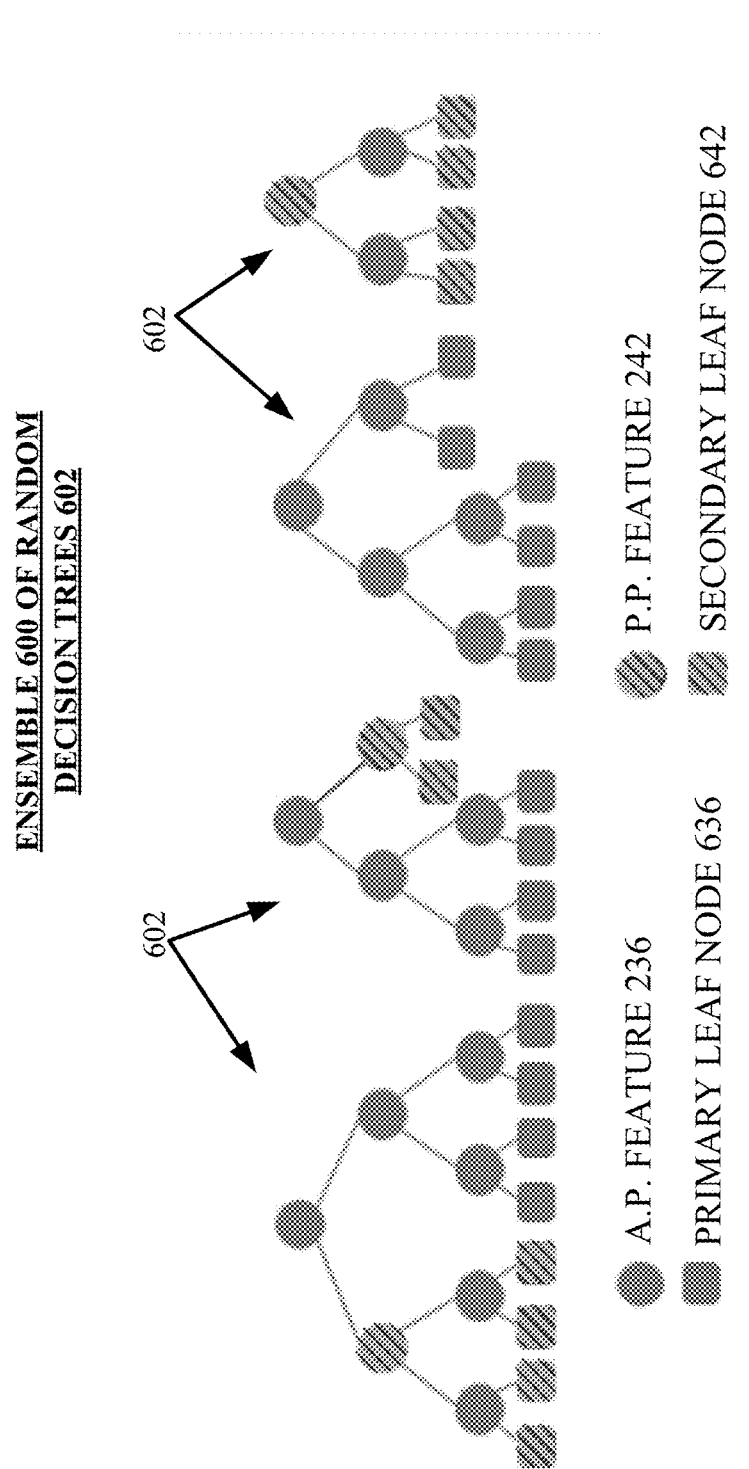
FIG. 6 illustrates a diagram of a privately trained random forest relative to the training of a machine learning model by the non-limiting system of FIG. 2, in accordance with one or more embodiments described herein.

That is, for example, turning briefly to FIG. 6 and the ensemble 600, the tree structures of the random decision trees 602 (RDTs 602) can be loaded with the active party features 236 and passive party features 242 of the data 230. The RDTs 602 also can comprise primary leaf nodes 636 and secondary leaf nodes 642. Primary leaf nodes 636 can extend from at least one active party feature 236. Secondary leaf nodes 642 can extend from at least one passive party feature 242.

Figure 7:
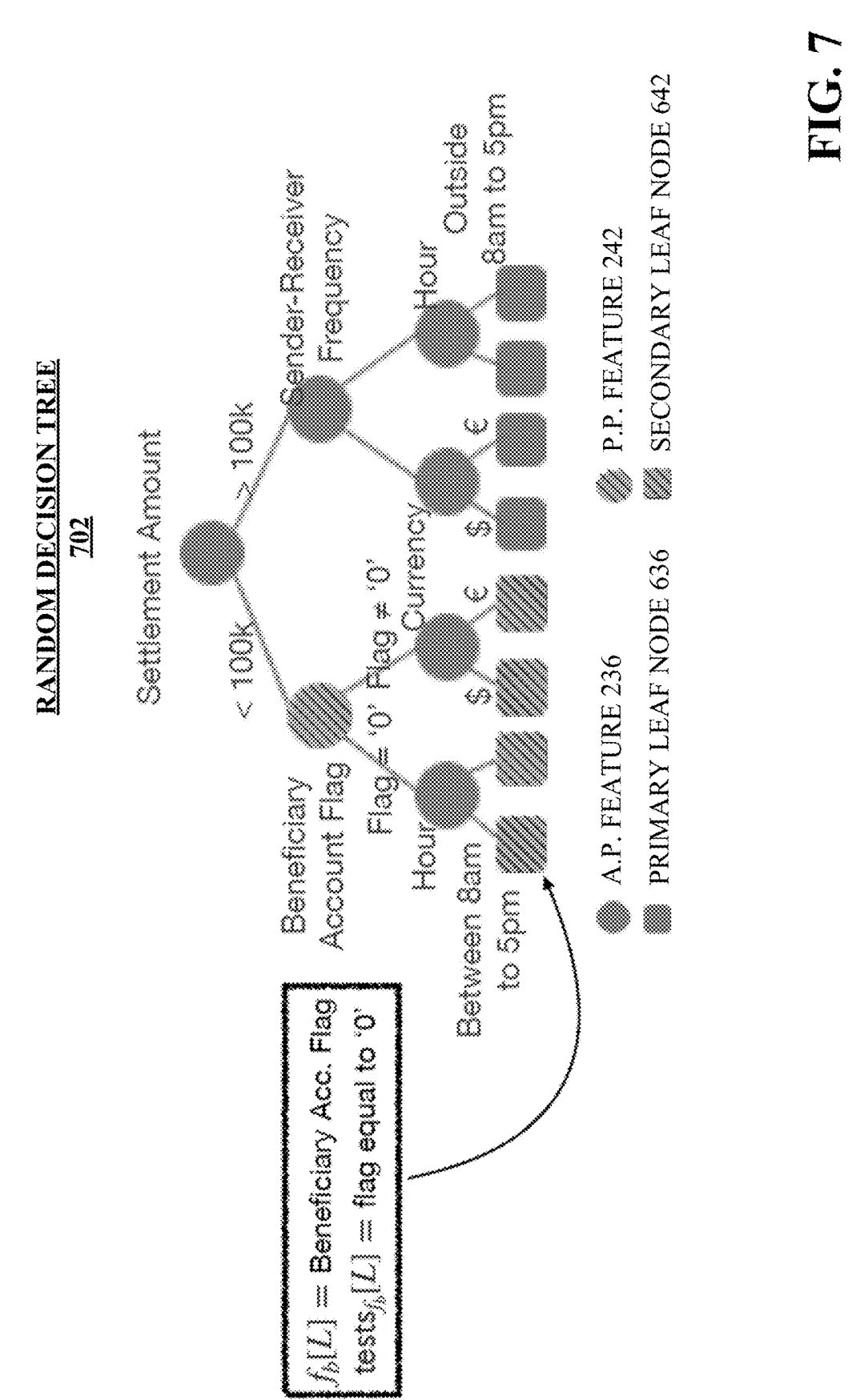
FIG. 7 illustrates a diagram of a single random decision tree of the random forest of FIG. 6, in accordance with one or more embodiments described herein.

Turning briefly to FIG. 7, in the exemplary case of a financial arena embodiment, active party features 236 can comprise settlement amounts, other monetary amounts, sender-receiver frequency, currency types, operating hours, etc. These active party features 236 can be known by the active party (e.g., financial transaction service) and by respective passive parties (e.g., banks). The passive party features 242 can comprise beneficiary account flags and other data not shared with the active party by the passive parties. That is, these features can be known only to the respective passive parties. As illustrated primary and secondary leaf nodes 636, 642 can comprise particular currency types, particular hours, particular currency amounts, etc.

Turning back to FIG. 2 and FIG. 6, labeling component 218 can be employed to generate primary labels for the primary leaf nodes 636. This generation can be performed locally at the FLIS 202 based on the known active party features 236 (e.g., known to the FLIS 202 and to the active party). The label of tree's leaves can be computed based on the values of the features of the trees for a particular sample set. For this purpose, cryptographic techniques including homomorphic encryption and hash tables can be used to compute these values without revealing private information with any other party (e.g., not controlling the FLIS 202).

The labeling component 218 and the aggregating component 220 together can collaborate, along with a federated learning and inference sub-system (FLISS) 252 at one or more passive parties, to generate secondary labels for the secondary leaf nodes 642. This process involves a plurality of steps discussed next.

First, referring still to FIGS. 2 and 6, for each secondary leaf node 642 (L), the labeling component 218 can compute a passive feature $f_b[L]$ associated with L and a feature value of the test ($tests f_b[L]$) associated with L. Giving a feature and a decision tree node with a pre-defined split value, the test can consist of verifying if the feature value is greater than the split value. If the value is higher, the split will go to the right branch, while if the value is lower, the sample would continue the left side. For example, consider a sample representing a transaction where one of the features is the of the transaction. A test evaluates: did the transaction occur between 8 am to 5 pm? If yes, the sample should continue the evaluation to left branch, otherwise the evaluation should continue to the right branch of the tree. The labeling component 218 can compute sets of label-$\ell$ candidate transactions $\mathcal{X}^\ell[L]$ which can be the subset of transactions that can satisfy all the tests associated with L except the test with $f_b$. Further, the labeling component 218 can compute the sets of pairs $\mathcal{A}^\ell[L] = \{(a_i, c_i)\}_{(i)}$, where $c_i$ is the number of times an account a appears in the transactions in $\mathcal{X}^\ell[L]$ under bank feature $f_b$.

Next, each individual passive party ($B_j$) can, employing respective FLISSs 252, partition its respective account identifiers as per flag values, where $\mathcal{A}^{flag}{}_{Bj}$ is the set of accounts at $B_j$ that have the flag value equal to flag.

Subsequently, the labeling component 218 and the passive parties can collaboratively execute a PISum functionality (e.g., comprising generating encrypted counts at passive parties) under homomorphic encryption (HE) to output encrypted counts for label-$\ell$ candidate transactions. Relative to the execution of the PISum functionality by the FLIS 202, the labeling component 218 can, for each primary leaf node 636, employ cuckoo hashing to generate an encrypted hash table and granting access to the encrypted hash table to the first passive party and to the other passive parties of the plurality of parties.

In response, each respective passive party can output its respective counts for its label-$\ell$ candidate transactions. Each passive party further can apply a differential privacy (DP) mechanism to its respective encrypted counts, such as by employing respective FLISSs 252, which encrypted accounts (having the DP mechanism applied) can then be obtained by the labeling component 218. Alternatively, the FLIS 202 can receive the encrypted counts absent any DP mechanism being applied and instead the FLIS 202 (e.g., the aggregating component 220) can apply a suitable DP mechanism and/or random noise to each of the encrypted counts.

Regarding a DP mechanism, it is noted that because the FLIS 202 and/or the active party can obtain a secondary label during an inference, an individual account identifier can be considered as a privacy unit. That is, neighboring datasets at a passive party can be datasets that can differ in a single account number. Accordingly, a step towards determining global sensitivity of the above-noted encrypted counts can be performed by pre-determining the bound on the number of participating transactions.

In an embodiment where the ensemble of one or more decision trees is generated randomly, the DP mechanism, $\varepsilon$-DP, can be made aware of such randomness resulting a reduction of the overall DP noise injected to achieve a good $\varepsilon$ without injecting more noise. Guarantees can be established using standard DP arguments and leveraging that the tree structure of the ensemble 600 does not itself depend on data but rather is generated (e.g., by the building component 216) prior to be loaded.

In an embodiment the aggregating component 220 can re-obtain the encrypted counts, apply a DP mechanism if not applied by the passive parties, or the encrypted counts can have had a differential privacy mechanism applied thereto, and can generate summations of the encrypted counts under homomorphic encryption (e.g., at the FLIS 202). The aggregating component 220 can send the aggregated encrypted counts back to each passive party. That is, each passive party can receive the same aggregated encrypted counts. In one or more other embodiments, the aggregating component 220 and/or the FLIS 202 can merely grant access for the aggregated encrypted counts to the passive parties.

Figure 8:
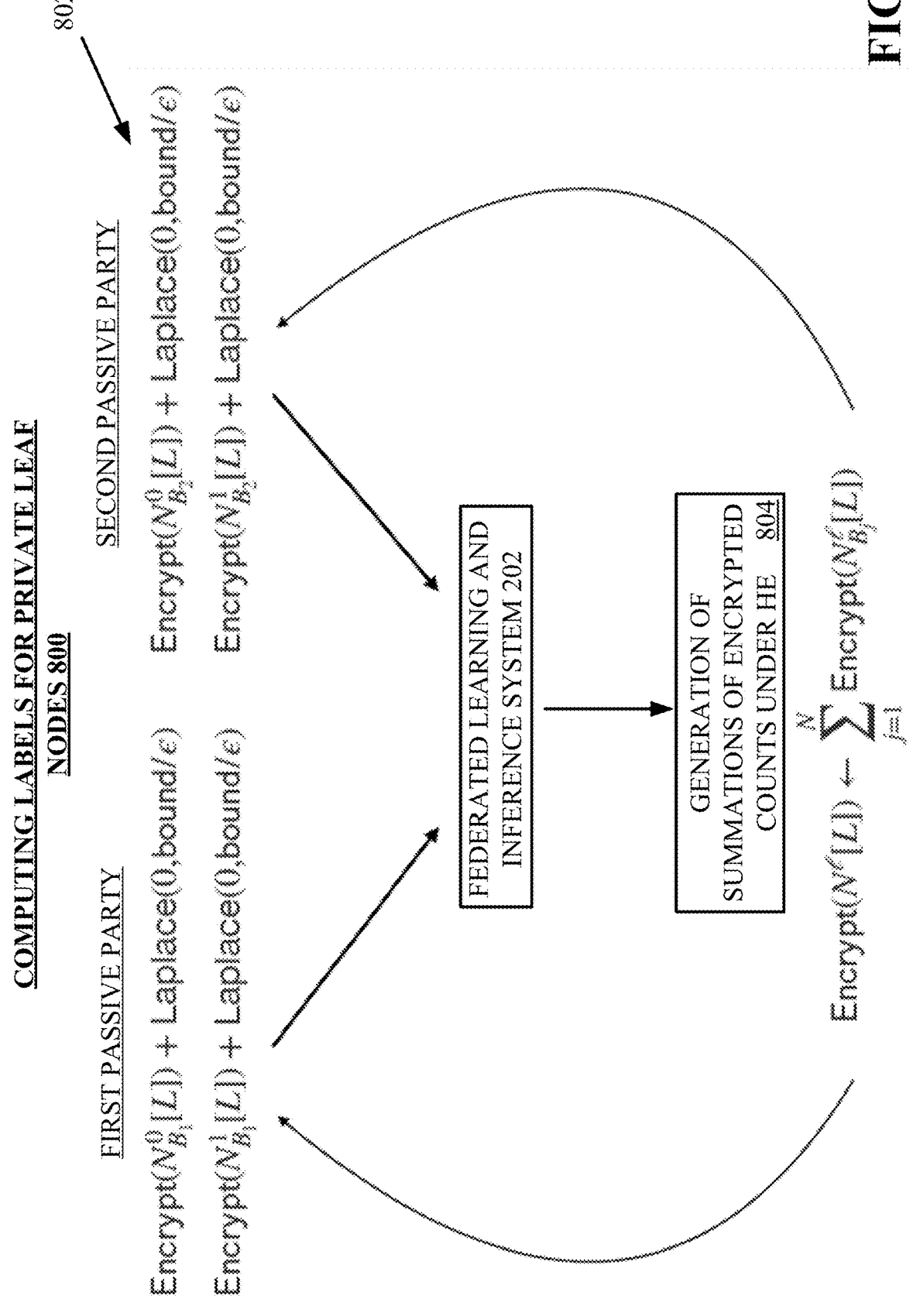
FIG. 8 illustrates a flow diagram of one or more processes that can be performed by the non-limiting system of FIG. 2, in accordance with one or more embodiments described herein.

Turning briefly to FIG. 8 and the process flow 800, a summary of various ones of the aforementioned processes are detailed. For example, the DP mechanism (e.g., a Laplace mechanism) can be applied by the passive parties at steps 802. First, the active and passive parties can agree a priori on a public positive integer bound. If an account of a passive party appears in more than bound transactions, then the active party and/or the aggregating component 220 can randomly select a subset of the accounts of the respective passive party, of a size equal to the bound, and can discard the other accounts. It is noted that the global sensitivity of the counts at the secondary leaf nodes can be bound. Each passive party can then apply the Laplace mechanism to its respective encrypted input. It is noted, relative to FIG. 8, that Laplace $(0,\lambda)$ denotes the Laplace distribution with mean 0 and variance $2\lambda^2$. In response, the aggregating component 220 can re-obtain the encrypted counts and at step 804 can generate the summations of the encrypted counts under homomorphic encryption, which aggregated encrypted counts can then be sent to the passive parties and/or access granted to the passive parties for respectively obtaining the counts.

Turning back to FIG. 2, in response to the obtaining by the passive parties of the aggregated encrypted counts, the passive parties, such as by employing respective FLISSs 252, can compute comparisons under HE for each secondary leaf node to obtain its encrypted label. In one or more embodiments, this step alternatively and/or additionally can be performed by the aggregating component 220 at the FLIS 202.

As a result, both primary labels for primary leaf nodes 636 and secondary labels for secondary leaf nodes 642 will have been obtained and can be subsequently loaded to the ensemble 600, such as by the labeling component 218 and/or the modeling component 224.

Discussion next turns to the inferential model 222 and to the modeling component 224.

The inferential model 222 can comprise and/or can be comprised by a classical model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, self-supervised, semi-supervised and/or unsupervised. For example, the inferential model 222 can be and/or can comprise an ML model.

Generally, the inferential model 222 can be trained, such as by the modeling component 224, on the loaded ensemble 600, which ensemble 600 has been privacy-enhanced in view of at least the application of the DP mechanism. The modeling component 224, in association with the labeling component 218 and aggregating component 220, the modeling component 224 can train the inferential model 222 using the data 230 from a plurality of parties and comprising horizontally partitioned data and vertically partitioned data, wherein the modeling component 224 employs the ensemble 600 of random decision trees 602 comprising the data 230 to train the inferential model 222. That is, using the ensemble 600, the modeling component 224 can train the inferential model 222 for use in executing one or more inferencing processes, such as in response to the query 240.

In one or more embodiments, further training and/or fine-tuning of the inferential model 222 can be executed by the modeling component 224 at any suitable frequency, such as on demand, upon identification of changes to the data 230 (e.g., by the assembling component 212), upon identification of a new related database (e.g., by the assembling component 212), and/or after an iteration of generation of an inference to a query. For example, an inference and any data/metadata output therewith can be employed by the modeling component 224 as historical data on which to train the inferential model 222 for better recognizing trends, such as relative to one or more future iterations of querying and inferencing.

The inferential model 222, once trained, can be used/executed. The use can include querying the inferential model 222. Alternatively, the inferential model 222 can be employed/shared in a federated learning approach whereby varying inferential models 222 and/or inferential model updates are aggregated to output a resultant and aggregated inferential model. Both sharing and execution of the inferential model 222, in view of the processes described above, can result in non-leakage of private data and/or private information of such private data.

For example, turning now to FIG. 9, a general process flow 900 illustrates one or more process that can be performed by the FLIS 202 (e.g., by the inference component 228, decrypting component 226 and/or inferential model 222) to output an inference 280 in response to a query 240. Inputs 902 to the process flow 900 can comprise the tree structure (e.g., from the building component 216) and the primary labels for the primary leaf nodes 636 (e.g., from the assembling component 212). Additional inputs 902 can comprise an unlabeled transaction tx associated with a query 240 and the encrypted secondary labels for the secondary leaf nodes 642 (e.g., from the labeling component 218 and/or aggregating component 220).

At step 902, the inference component 228 can employ the inferential model 222 to, for each tree 602 in the ensemble

600 on which the inferential model 222 is trained, filter out the transaction tx through each respective tree 602.

At decision step 906, the inferential model 222 can determine whether the transaction has reached a primary leaf node 636. Where the response is yes, the process flow 900 can proceed to step 909. Where the response is no, and the transaction has instead reached a secondary leaf node 642, the process flow 900 can instead proceed to step 908.

At step 908, the inferential model 222 can obtain an encrypted secondary label for a secondary leaf node 642, either from the ensemble 600 or from additional collaboration with the passive parties. At step 910, the inferential model 222 can employ the decrypting component 226 to decrypt the encrypted secondary label. That is, the decrypting component 226, using the previously generated private HE key, can decrypt the encrypted secondary label of the secondary leaf node 642 to generate a decrypted secondary label.

At step 909, from the ensemble 600, the inferential model 222 can obtain the respective primary label for the primary leaf node 636 reached.

At decision step 912, following from either step 910 or step 909, the inferential model 222 can determine whether an additional tree 602 remains through which the transaction tx has not been filtered. Where the response is yes, the process flow 900 can proceed back to step 904. Where the response is no, the process flow 900 can proceed to step 914.

At step 914, the inferential model 222 can generate a resultant decrypted secondary label with a majority vote of the passive parties and having a confidence interval related thereto that is equal to the fraction of the majority of the passive parties.

Outputs 916 to the process flow 900 can comprise these resultant decrypted secondary labels and the associated confidence scores.

Referring next to FIGS. 10 and 11, illustrated is a flow diagram of an example, non-limiting method 1000 that can provide a process train a machine learning model and provide an inference while employing privacy-enhancing approaches, in accordance with one or more embodiments described herein, such as the non-limiting system 200 of FIG. 2. While the non-limiting method 1000 is described relative to the non-limiting system 200 of FIG. 2, the non-limiting method 1000 can be applicable also to other systems described herein, such as the non-limiting system 100 of FIG. 1. Repetitive description of like elements and/or processes employed in respective embodiments is omitted for sake of brevity.

At 1002, the non-limiting method 1000 can comprise obtaining, by a system operatively coupled to a processor (e.g., assembling component 210), data from an active party and one or more passive parties, which data is both vertically and horizontally partitioned.

In one or more embodiments, the system can be owned by and/or associated with the first party.

At 1004, the non-limiting method 1000 can comprise generating, by the system (e.g., keying component 214), a public key and private key pair for homomorphic encryption of the data, wherein the public key is shared with the passive parties.

At 1006, the non-limiting method 1000 can comprise generating, by the system (e.g., building component 216), a tree structure for use for the random decision tree.

At 1008, the non-limiting method 1000 can comprise generating, by the system (e.g., labeling component 218), a primary label for a primary leaf nodes for the random decision tree, wherein the primary leaf node comprises data of the data known only by an active party, of the plurality of parties, and by the first passive party.

At 1010, the non-limiting method 1000 can comprise executing, by the system (e.g., labeling component 218), a PISum functionality under homomorphic encryption that outputs encrypted counts.

At 1011, the non-limiting method can comprise executing, by the system (e.g., labeling component 218), the functionality comprising generating encrypted counts at passive parties using cuckoo hashing and homomorphic encryption.

At 1012, the non-limiting method 1000 comprises for executing the PISum functionality, for each private secondary node, employing, by the system (e.g., labeling component 218), cuckoo hashing to generate an encrypted hash table and granting access to the encrypted hash table first passive party and to the other passive parties of the plurality of parties.

At 1014, the non-limiting method 1000 comprises determining, by the system (e.g., aggregating component 220), whether summations of the encrypted counts have been generated under homomorphic encryption. If yes, the non-limiting method 1000 proceeds back to step 1016. If no, the non-limiting method 1000 proceeds back to steps 1010 through 1012.

At 1016, the non-limiting method 1000 comprises re-obtaining, by the system (e.g., aggregating component 220), the encrypted counts, wherein the encrypted counts have had a differential privacy mechanism pr random noise applied thereto.

At 1018, the non-limiting method 1000 can comprise generating, by the system (e.g., aggregating component 220), summations of the encrypted counts under homomorphic encryption.

At 1020, the non-limiting method 1000 can comprise training, by the system (e.g., modeling component 224), an inferential model (e.g., inferential model 222) using data from a plurality of parties and comprising horizontally partitioned data and vertically partitioned data, further comprising employing, by the system (e.g., modeling component), an ensemble of random decision trees comprising the data to train the inferential model.

At 1022, the non-limiting method 1000 can comprise obtaining, by the system (e.g., inference component 228), a label, by the inference component, of a primary leaf node from an active party of the plurality of parties and obtaining, by the system (e.g., inference component 228), an encrypted label of a secondary leaf node by performing a collaborative comparison process among the active party and the first passive party, wherein the secondary leaf node comprises data of the data known only by the first passive party, and wherein the primary leaf node comprises data of the data known by the active party and by the first passive party.

At 1024, the non-limiting method 1000 can comprise decrypting, by the system (e.g., decrypting component 226), using a homomorphic encryption key, an encrypted label of a secondary leaf node to generate a decrypted secondary label, wherein the generating the inference further comprises employing the decrypted secondary label and the primary label, wherein the secondary leaf node comprises data of the data known only by the first passive party, and wherein the primary leaf node comprises data of the data known by the first passive party and by the active party.

At 1026, the non-limiting method 1000 can comprise responding to the query, by the system (e.g., inference component 228), employing the inferential model, by generating an inference, wherein first private data, of the data, originating from the first passive party of the plurality of parties, is not directly shared with other passive parties of the plurality of parties to generate the inference. The first private data likewise is not directly shared with the active party.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more devices, computer program products and/or computer-implemented methods of use provided herein relate to federated training and inferencing. A system can comprise a memory that stores computer executable components, and a processor that executes the computer executable components stored in the memory, wherein the computer executable components can comprise a modeling component that trains an inferential model using data from a plurality of parties and comprising horizontally partitioned data and vertically partitioned data, wherein the modeling component employs a random decision tree comprising the data to train the inferential model, and an inference component that responds to a query, employing the inferential model, by generating an inference, wherein first party private data, of the data, originating from a first passive party of the plurality of parties, is not directly shared with other passive parties of the plurality of parties to generate the inference.

An advantage of the above-indicated system, computer-implemented method and/or computer program product can be providing for maintaining of privacy of private information of a database during any one or more of federated training of an inferential model or use of an inferential model to respond to a query. That is, although the inferential model can be employed by a plurality of entities and/or shared, use of the inferential model does not result in exposure of private data. This can be useful in the fields of healthcare, finances and/or social networking where maintaining privacy of data can be desired, contracted and/or legally regulated.

Another advantage of the above-indicated system, computer-implemented method and/or computer program product can be an ability to train an inferential model employing privacy limitations where the inferential model can be employed representatively as a machine-learning-as-a-service. That is, an administrator entity using system, method and/or computer program product detailed herein can aggregate data and/or trained models, using federated training, to return an trained model without having directly accessed the private data of parties. Likewise, passive entities using the system, method and/or computer program, and having private data that contributed to the inferential model, can employ the inferential model absent private data of any one passive entity being directly shared with any other passive entity.

Another advantage of the above-indicated system, computer-implemented method and/or computer program product can be the incorporation of differential privacy (DP) mechanisms to protect privacy during inference using the inferential model, but without compromising accuracy. That is, DP can be a principled method to defend against inference-time attacks such as membership inference attacks. Use of DP can allow for a favorable privacy-vs-utility trade-off.

Another advantage of the above-indicated system, computer-implemented method and/or computer program product can be the ability to train the inferential model on complex features, such as, but not limited to, features derived from transaction data, but without compromising the privacy of private data comprised by the transaction data.

Indeed, in view of the one or more embodiments described herein, a practical application of the one or more systems, computer-implemented methods and/or computer program products described herein can be ability to prevent unintended sharing of private information, but rather trained models can instead be shared. Such is a useful and practical application of computers, thus providing enhanced (e.g., improved and/or optimized) privacy whether for a desired purpose, contracted purpose and/or regulated purpose. Overall, such computerized tools can constitute a concrete and tangible technical improvement in the fields of privacy-enhanced data analysis, privacy-enhanced machine learning and federated learning and inferencing.

Furthermore, one or more embodiments described herein can be employed in a real-world system based on the disclosed teachings. For example, one or more embodiments described herein can function with a query system, storage system and/or file management system that can receive as input a query and/or file, and which as an output can provide an output inference while employing a federated-trained inferential model to prevent access to private information accessed by the system.

Moreover, a device and/or method described herein can be implemented in one or more domains to enable scaled model training and/or query responses. Indeed, use of a system as described herein can be scalable, such as where plural inputs databases (e.g., comprising data) can be evaluated, plural inferential models can be trained and/or plural inferences can be generated at least partially at a same time as one another.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to privacy-enhanced machine learning and inferencing, as compared to existing systems and/or techniques. Systems, computer-implemented methods and/or computer program products providing performance of these processes are of great utility in the fields of privacy-enhanced data analysis and privacy-enhanced machine learning, and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively automatically use federated training to train a inferential model while providing for privacy enhancement that prevents leakage of private data on which the inferential model is trained as the one or more embodiments described herein can provide this process. Moreover, neither can the human mind nor a human with pen and paper conduct one or more of these processes, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

Turning next to FIG. 12, a detailed description is provided of additional context for the one or more embodiments described herein at FIGS. 1-11.

FIG. 12 and the following discussion are intended to provide a brief, general description of a suitable computing environment 1200 in which one or more embodiments described herein at FIGS. 1-1 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1200 contains an example of an environment for the execution of at least some of the computer code involved in performing the inventive methods, such as translation of an original source code based on a configuration of a target system by the inferential model training code 1280. In addition to block 1280, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 1280, as identified above), peripheral device set 1214 (including user interface (UI), device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible. Computer 1201 may be located in a cloud, even though it is not shown in a cloud in FIG. 12. On the other hand, computer 1201 is not required to be in a cloud except to any extent as may be affirmatively indicated.

PROCESSOR SET 1210 includes one, or more, computer processors of any type now known or to be developed in the future. Processing circuitry 1220 may be distributed over multiple packages, for example, multiple, coordinated integrated circuit chips. Processing circuitry 1220 may implement multiple processor threads and/or multiple processor cores. Cache 1221 is memory that is located in the processor chip package and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 1200, at least some of the instructions for performing the inventive methods may be stored in block 1280 in persistent storage 1213.

COMMUNICATION FABRIC 1211 is the signal conduction path that allows the various components of computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, the volatile memory is characterized by random access, but this is not required unless affirmatively indicated. In computer 1201, the volatile memory 1212 is located in a single package and is internal to computer 1201, but, alternatively or additionally, the volatile memory may be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid-state storage devices. Operating system 1222 may take several forms, such as various known proprietary operating systems or open-source Portable Operating System Interface type operating systems that employ a kernel. The code included in block 1280 typically includes at least some of the computer code involved in performing the inventive methods.

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 may be persistent and/or volatile. In some embodiments, storage 1224 may take the form of a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. IoT sensor set 1225 is made up of sensors that can be used in Internet of Things applications. For example, one sensor may be a thermometer and another sensor may be a motion detector.

NETWORK MODULE 1215 is the collection of computer software, hardware, and firmware that allows computer 1201 to communicate with other computers through WAN 1202. Network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201) and may take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 may be a client device, such as thin client, heavy client, mainframe computer, desktop computer and so on.

REMOTE SERVER 1204 is any computer system that serves at least some data and/or functionality to computer 1201. Remote server 1204 may be controlled and used by the same entity that operates computer 1201. Remote server 1204 represents the machine that collects and stores helpful and useful data for use by other computers, such as computer 1201. For example, in a hypothetical case where computer 1201 is designed and programmed to provide a recommendation based on historical data, then this historical data may be provided to computer 1201 from remote database 1230 of remote server 1204.

PUBLIC CLOUD 1205 is any computer system available for use by multiple entities that provides on-demand availability of computer system resources and/or other computer capabilities, especially data storage (cloud storage) and computing power, without direct active management by the scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
a memory that stores computer executable components; and
a processor that executes the computer executable components stored in the memory, wherein the computer executable components comprise:
a modeling component that trains an inferential model using data from a plurality of parties and comprising horizontally partitioned data and vertically partitioned data, wherein the modeling component employs a random decision tree comprising the data to train the inferential model;
an inference component that responds to a query, employing the inferential model, by generating an inference, wherein first party private data, of the data, originating from a first passive party of the plurality of parties, is not directly shared with other passive parties of the plurality of parties to generate the inference; and a labeling component that generates a primary label for a primary leaf node for the random decision tree, wherein the primary leaf node comprises data of the data known only by an active party, of the plurality of parties, and by the first passive party.

2. The system of claim 1, further comprising:

a building component that generates a tree structure for use for the random decision tree.

3. The system of claim 1, wherein the labeling component executes a PISum functionality under homomorphic encryption that outputs an encrypted count related to a secondary leaf node comprising data of the data known only by the first passive party.

4. The system of claim 3, further comprising:

an aggregating component that re-obtains the encrypted count and another encrypted count, wherein the encrypted counts have had a differential privacy mechanism or random noise applied thereto, and that generates a summation of the encrypted counts under homomorphic encryption.

5. The system of claim 3, further comprising:

wherein the executing the PISum functionality comprises, for each secondary leaf node, employing, by the labeling component, cuckoo hashing to generate an encrypted hash table and granting access to the encrypted hash table to the first passive party and to the other passive parties of the plurality of parties.

6. The system of claim 1, wherein generating an inference comprises obtaining a label, by the inference component, of a primary leaf node from an active party of the plurality of parties and obtaining, by the inference component, an encrypted label of a secondary leaf node by performing a collaborative comparison process among the active party and the first passive party, wherein the secondary leaf node comprises data of the data known only by the first passive party, and wherein the primary leaf node comprises data of the data known by the active party and by the first passive party.

7. The system of claim 1, further comprising:

a decrypting component that, using a homomorphic encryption key, decrypts an encrypted label of a secondary leaf node to generate a decrypted secondary label, wherein the generating the inference further comprises employing the decrypted secondary label and a primary label, which primary label corresponds to a primary leaf node, wherein the primary leaf node comprises data of the data known only by an active party and the first passive party, and wherein the secondary leaf node comprises data of the data known only by the first passive party.

8. A computer-implemented method, comprising:

training, by a system operatively coupled to a processor, an inferential model using data from a plurality of parties and comprising horizontally partitioned data and vertically partitioned data;

employing, by the system, a random decision tree comprising the data to train the inferential model;

responding to a query, by the system, employing the inferential model, by generating an inference, wherein first party private data, of the data, originating from a first passive party of the plurality of parties, is not directly shared with other passive parties of the plurality of parties to generate the inference; and generating, by the system, a primary label for a primary leaf node for the random decision tree, wherein the primary leaf node comprises data of the data known only by an active party, of the plurality of parties, and by the first passive party.

9. The computer-implemented method of claim 8, further comprising:

generating, by the system, a tree structure for use for the random decision tree.

10. The computer-implemented method of claim 8, further comprising:

executing, by the system, a PISum functionality under homomorphic encryption that outputs an encrypted count related to a secondary leaf node comprising data of the data known only by the first passive party.

11. The computer-implemented method of claim 10, further comprising:

re-obtaining, by the system, the encrypted count and another encrypted count, wherein the encrypted counts have had a differential privacy mechanism or random noise applied thereto; and generating, by the system, a summation of the encrypted counts under homomorphic encryption.

12. The computer-implemented method of claim 8, further comprising:

decrypting, by the system, using a homomorphic encryption key, an encrypted label of a secondary leaf node to generate a decrypted secondary label, wherein the generating the inference further comprises employing the decrypted secondary label and a primary label, which primary label corresponds to a primary leaf node, wherein the primary leaf node comprises data of the data known only by an active party and the first passive party, and wherein the secondary leaf node comprises data of the data known only by the first passive party.

13. A computer program product facilitating a process to perform federated learning and inferencing, the computer program product comprising a computer readable storage medium having program instructions embodied therewith, the program instructions executable by a processor to cause the processor to:

train, by the processor, an inferential model using data from a plurality of parties and comprising horizontally partitioned data and vertically partitioned data;

employ, by the processor, a random decision tree comprising the data to train the inferential model;

respond to a query, by the processor, to a query, employing the inferential model, by generating an inference, wherein first party private data, of the data, originating from a first passive party of the plurality of parties, is not directly shared with other passive parties of the plurality of parties to generate the inference; and generate, by the processor, a primary label for a primary leaf node for the random decision tree, wherein the primary leaf node comprise data of the data known only by an active party, of the plurality of parties, and by the first passive party.

14. The computer program product of claim 13, wherein the program instructions are further executable by the processor to cause the processor to:

generate, by the processor, a tree structure for use for the random decision tree.

15. The computer program product of claim 13, wherein the program instructions are further executable by the processor to cause the processor to:

execute, by the processor, a PISum functionality under homomorphic encryption that outputs encrypted counts related to a secondary leaf node comprising data of the data known only by the first passive party.

16. The computer program product of claim 15, wherein the program instructions are further executable by the processor to cause the processor to:

re-obtain, by the processor, the encrypted count and another encrypted count, wherein the encrypted counts have had a differential privacy mechanism or random noise applied thereto; and generate, by the second party, a summation of the encrypted counts under homomorphic encryption.

17. The computer program product of claim 13, wherein the program instructions are further executable by the processor to cause the processor to:

decrypt, by the processor, using a homomorphic encryption key, decrypts an encrypted label of a secondary leaf node to generate a decrypted secondary label, wherein the generating the inference further comprises employing the decrypted secondary label and a primary label, which primary label corresponds to a primary leaf node, wherein the primary leaf node comprises data of the data known only by an active party and the first passive party, and wherein the secondary leaf node comprises data of the data known only by the first passive party.

* * * * *